Dec. 2, 1930.                    E. KASSNER                    1,783,943
          COMBINED DUPLEX ADDING MACHINE AND CASH REGISTER
                    Filed Jan. 8, 1927          14 Sheets-Sheet 1
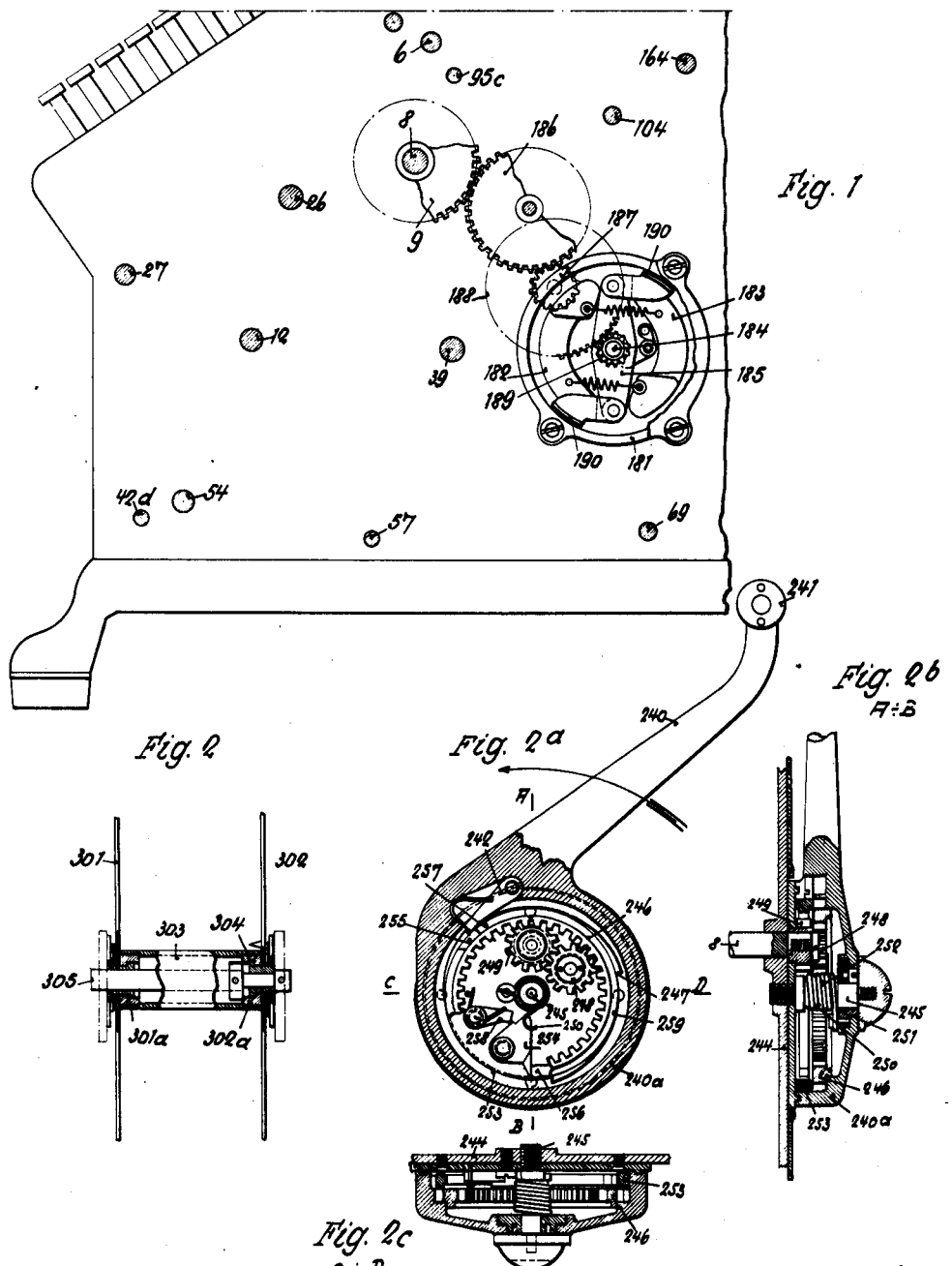
Inventor
ERNST KASSNER
Ruege, Boyce & Bakelar
Attorneys

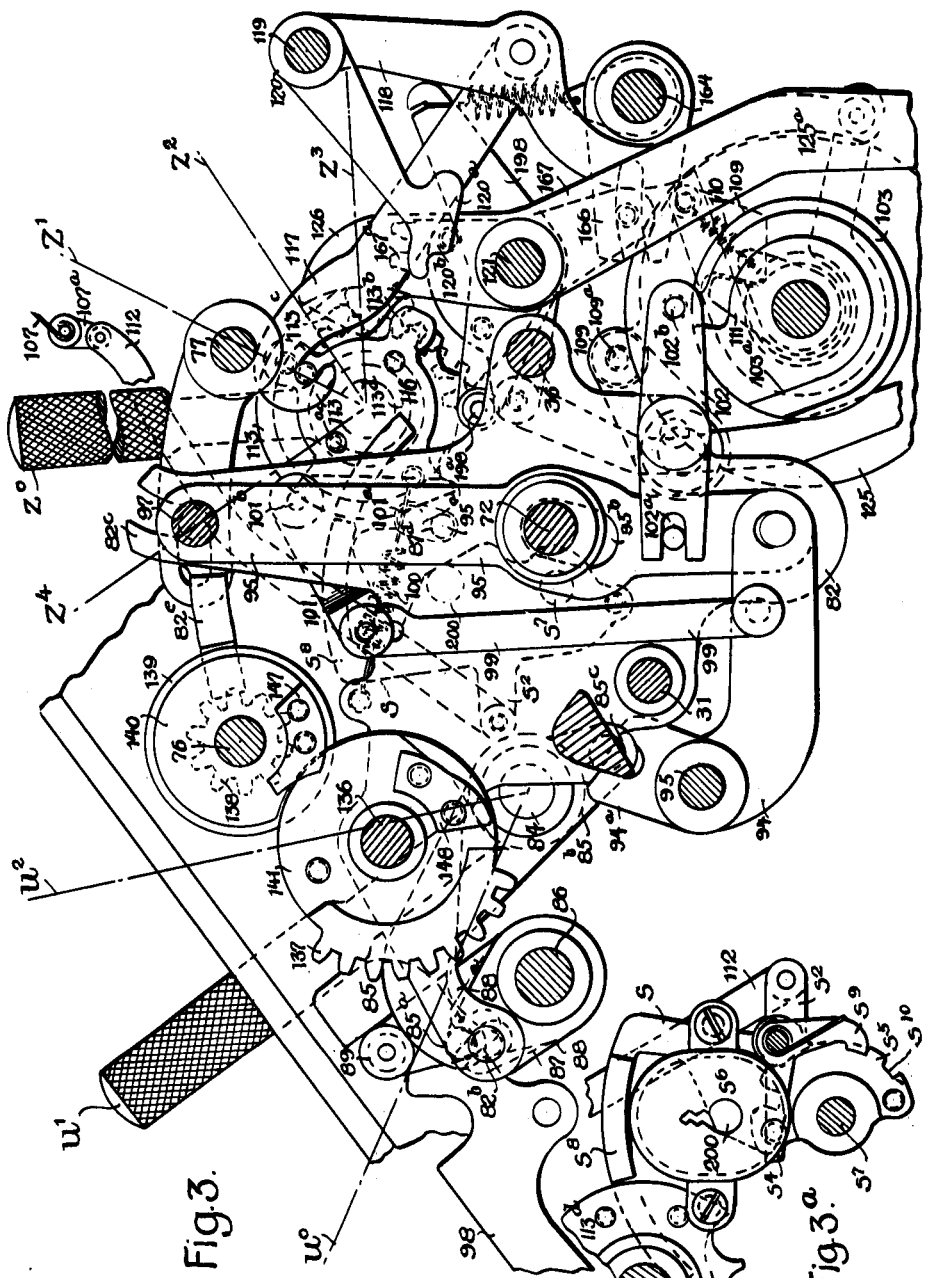

Dec. 2, 1930.  E. KASSNER  1,783,943
COMBINED DUPLEX ADDING MACHINE AND CASH REGISTER
Filed Jan. 8, 1927   14 Sheets-Sheet 4
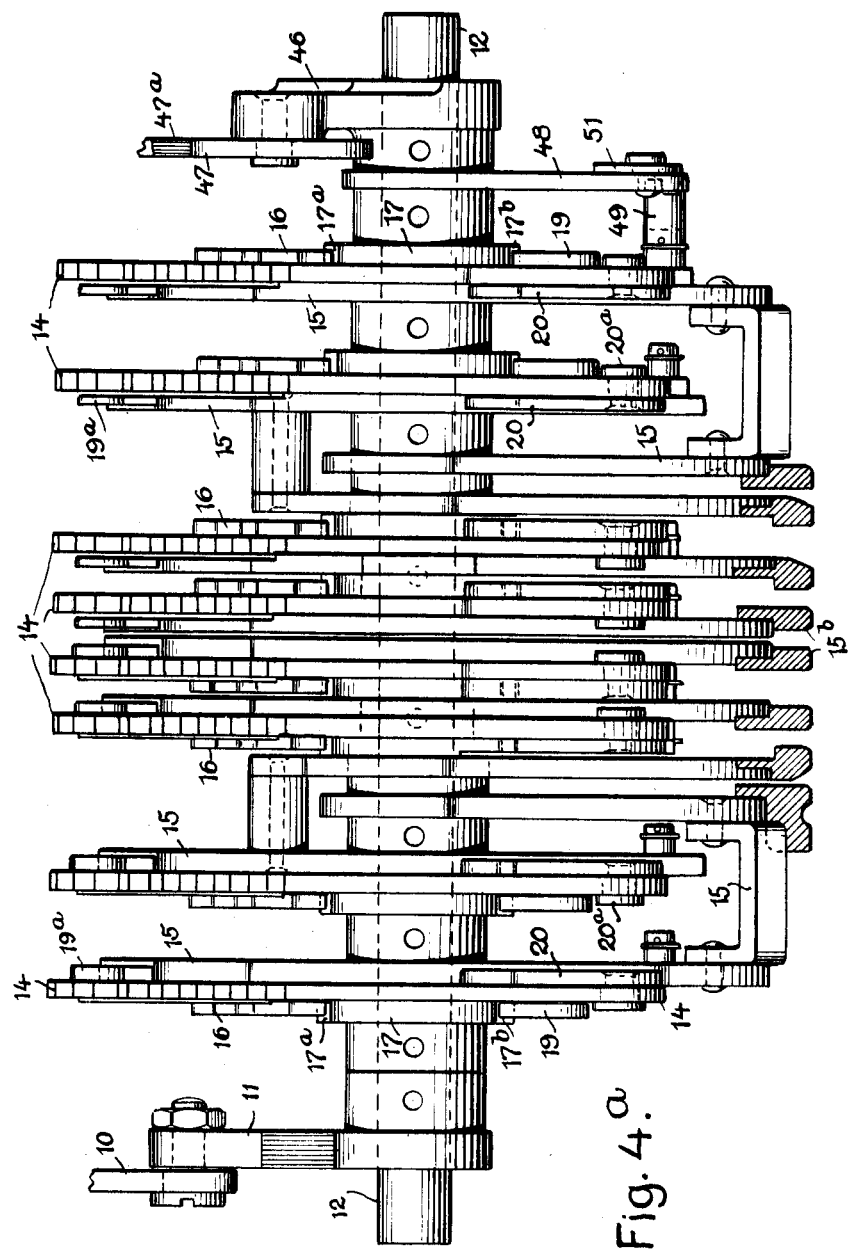
Fig. 4.ᵃ
INVENTOR.
ERNST KASSNER
BY
ATTORNEY Dec. 2, 1930.  E. KASSNER  1,783,943
COMBINED DUPLEX ADDING MACHINE AND CASH REGISTER
Filed Jan. 8, 1927  14 Sheets-Sheet 5
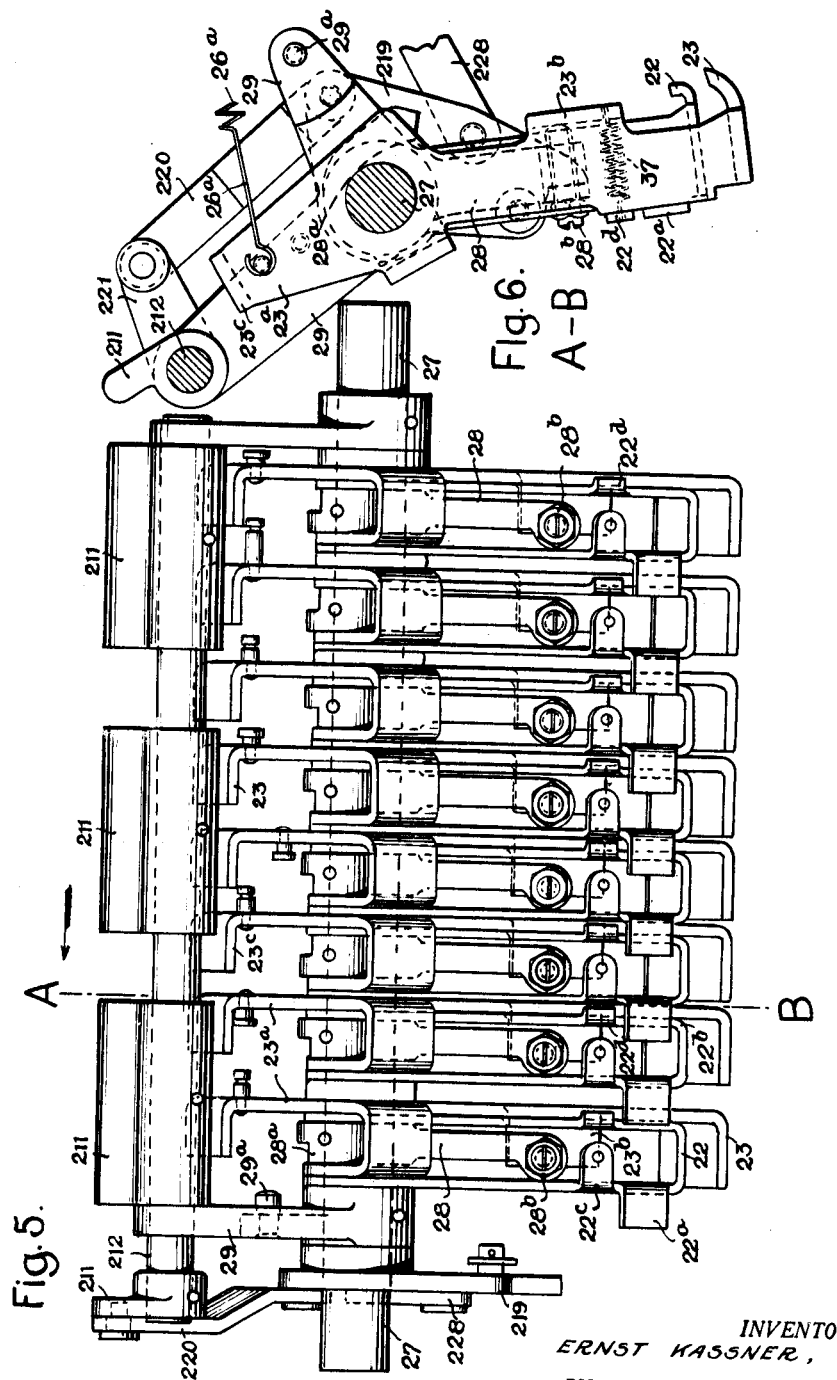
INVENTOR.
ERNST KASSNER,
BY
Auge, Boyce + Bakelar
ATTORNEY

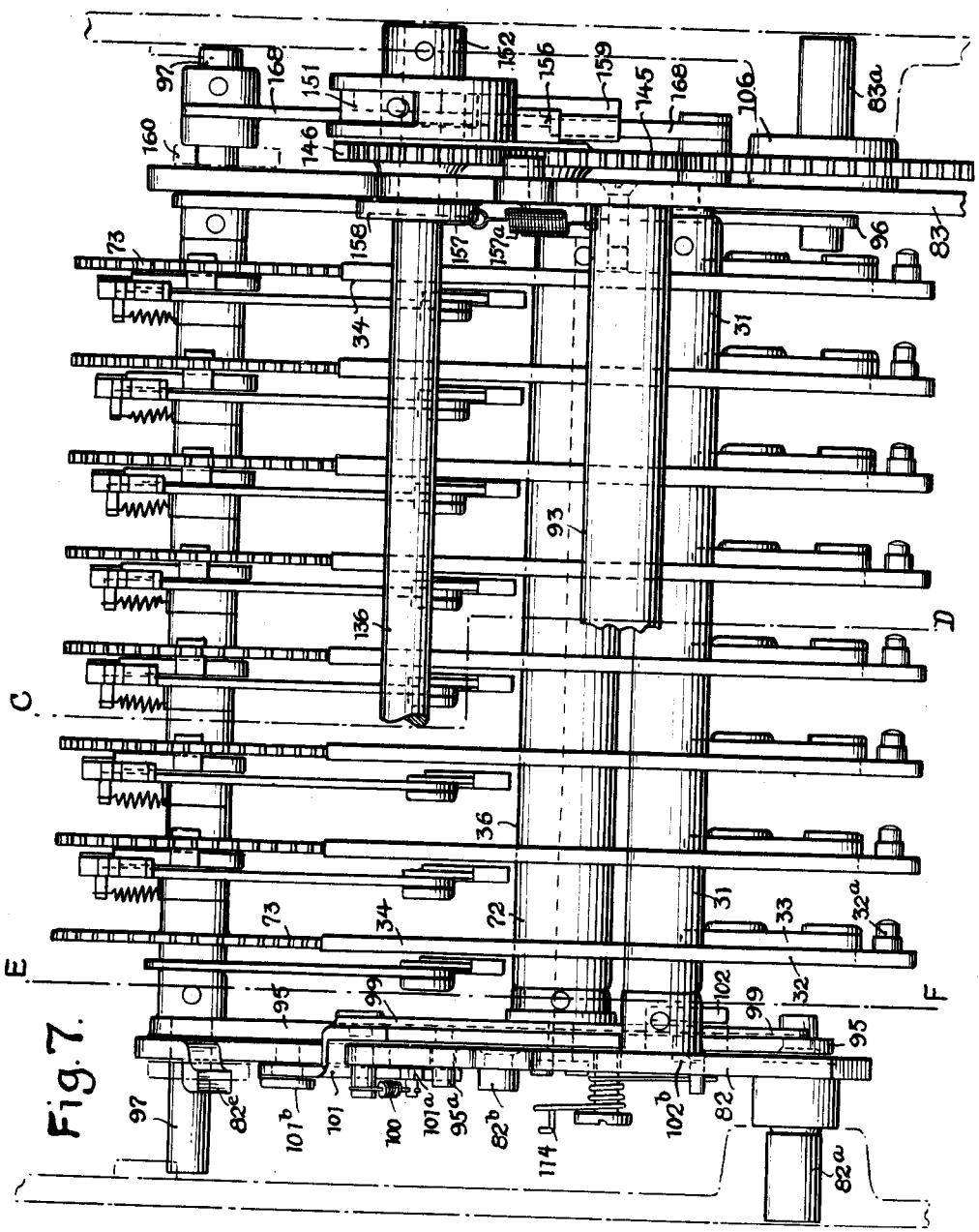

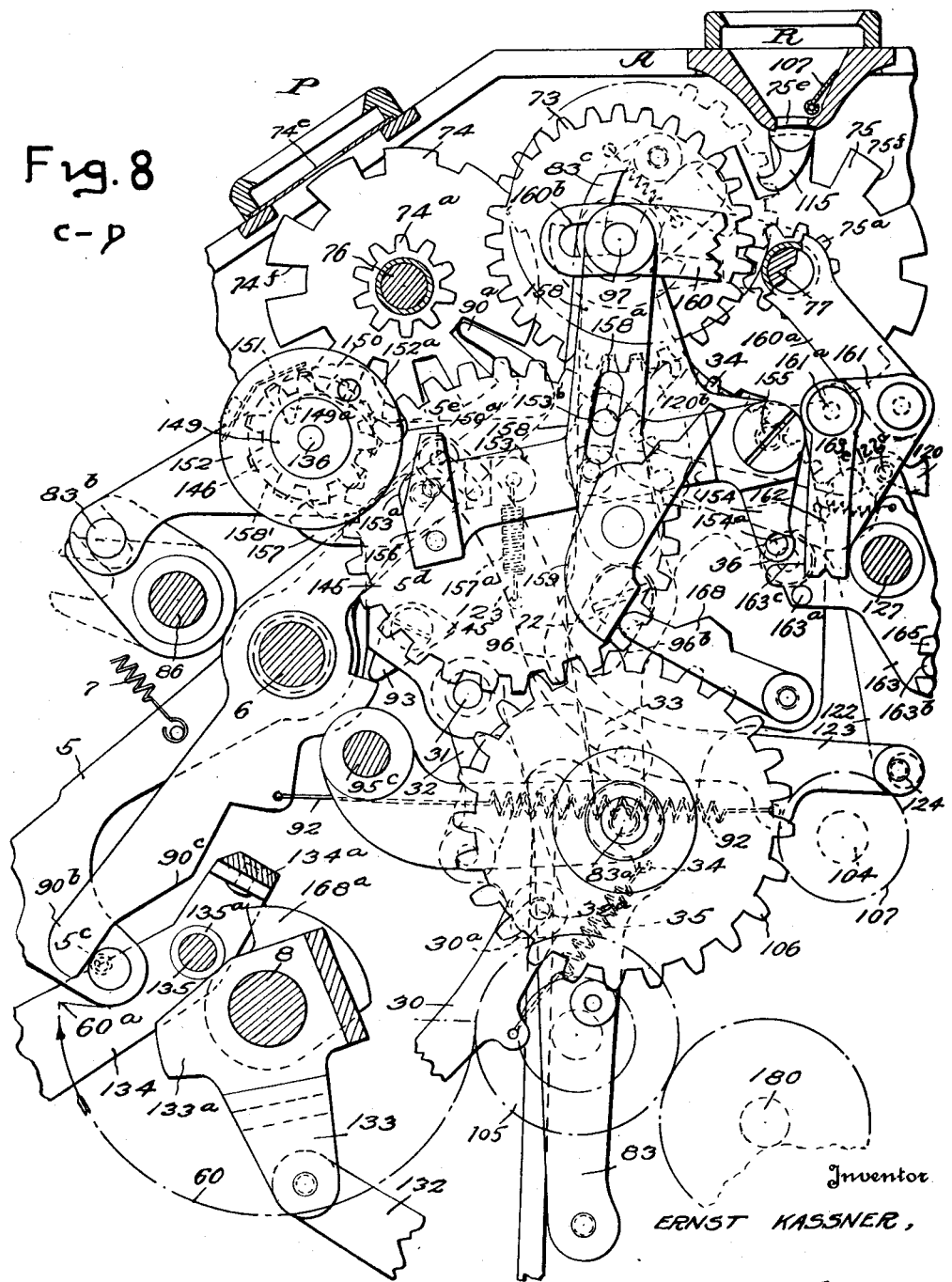

Dec. 2, 1930.                E. KASSNER                 1,783,943
           COMBINED DUPLEX ADDING MACHINE AND CASH REGISTER
                   Filed Jan. 8, 1927        14 Sheets-Sheet 8
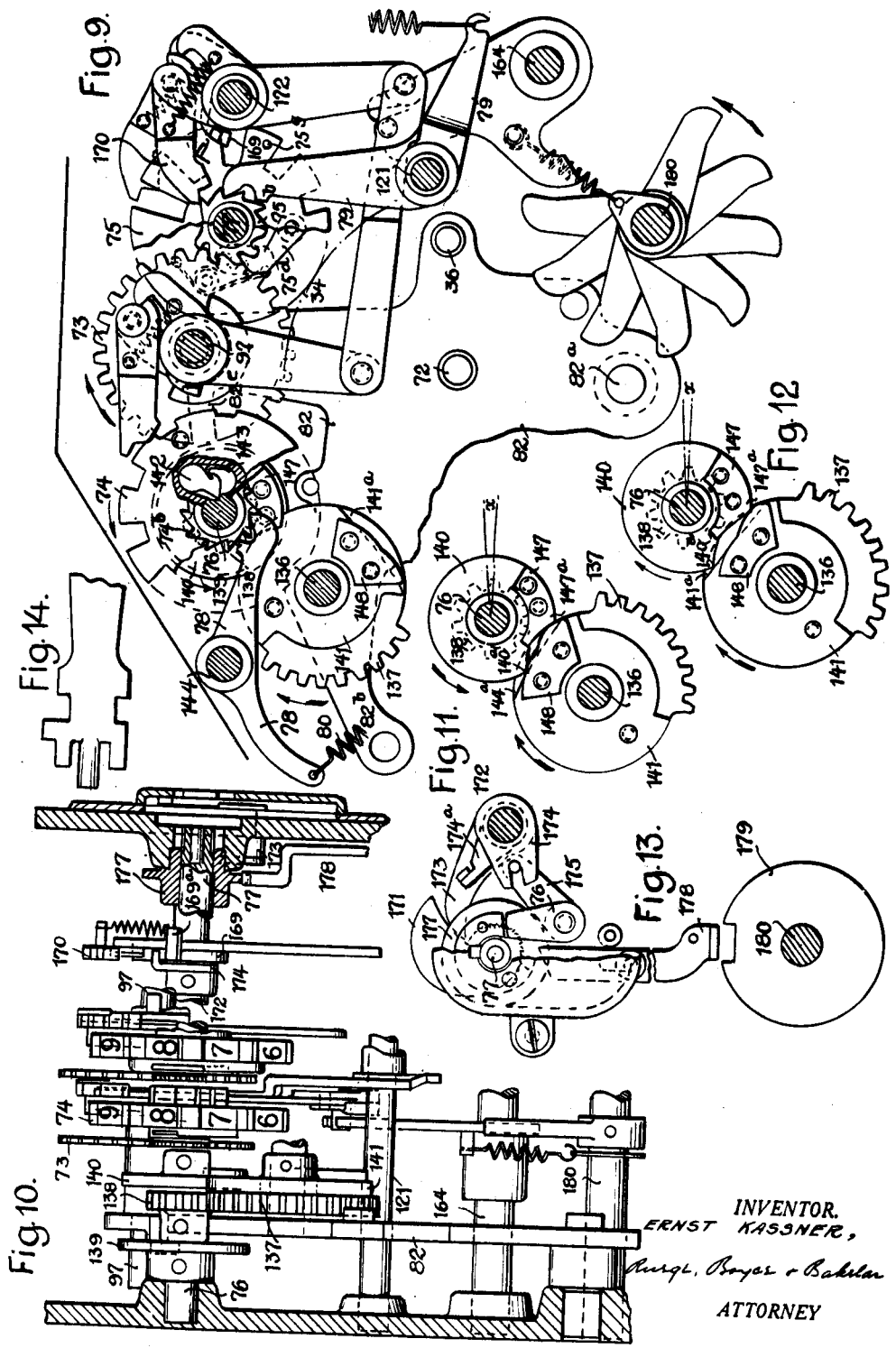
INVENTOR.
ERNST KASSNER,
ATTORNEY Dec. 2, 1930.    E. KASSNER    1,783,943
COMBINED DUPLEX ADDING MACHINE AND CASH REGISTER
Filed Jan. 8, 1927    14 Sheets-Sheet 9
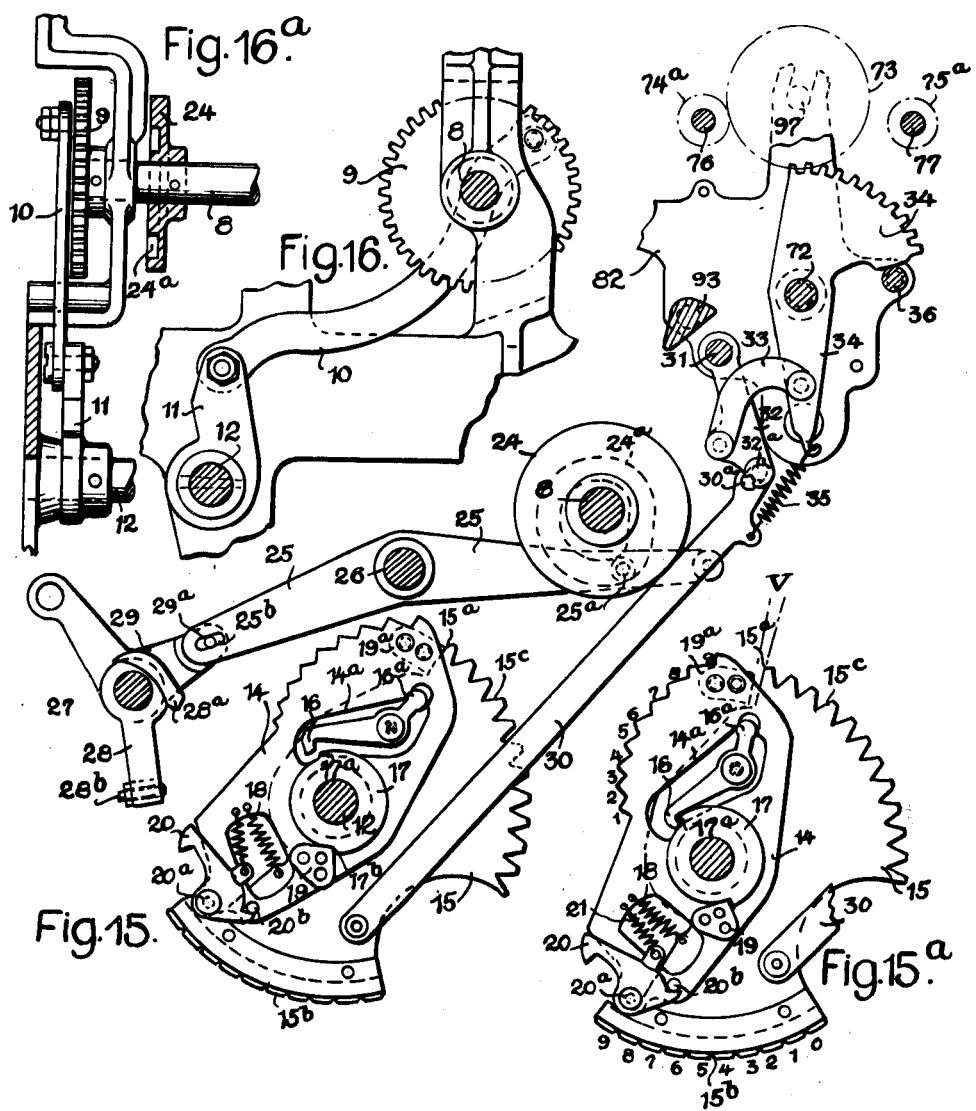
INVENTOR.
ERNST KASSNER,
BY
ATTORNEY Dec. 2, 1930. E. KASSNER 1,783,943
COMBINED DUPLEX ADDING MACHINE AND CASH REGISTER
Filed Jan. 8, 1927 14 Sheets-Sheet 10

INVENTOR.
ERNST KASSNER,
ATTORNEY

Fig. 18ᵃ

Dec. 2, 1930.  E. KASSNER  1,783,943
COMBINED DUPLEX ADDING MACHINE AND CASH REGISTER
Filed Jan. 8, 1927  14 Sheets-Sheet 12
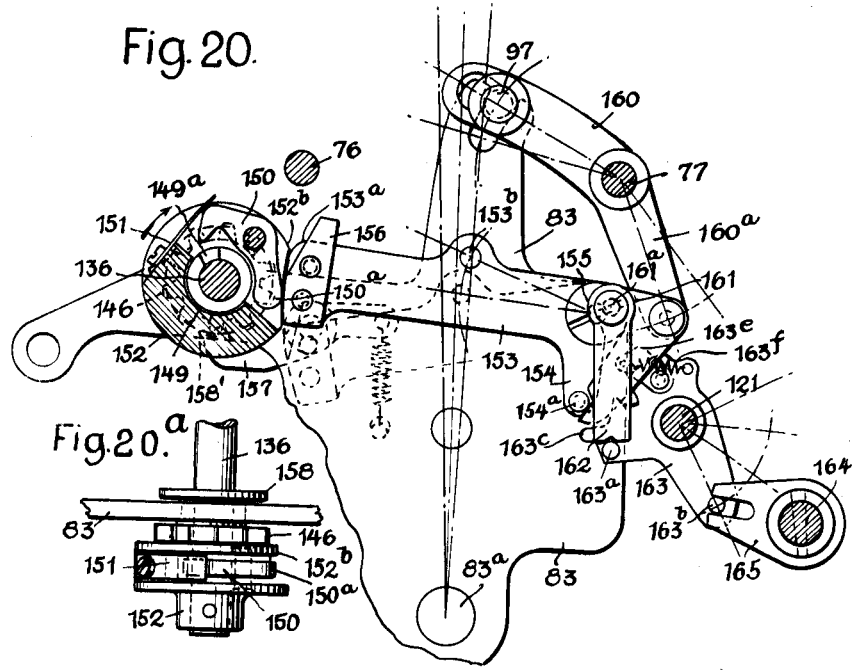
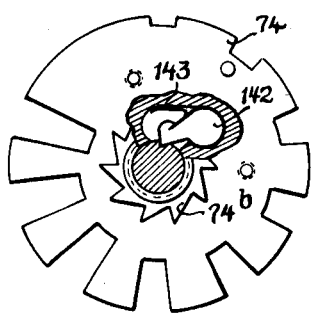
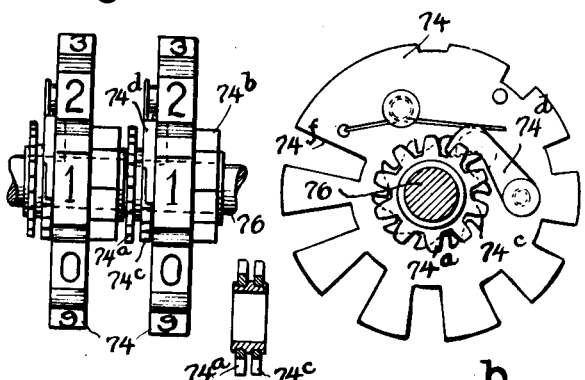
INVENTOR.
ERNST KASSNER,
BY
ATTORNEY Dec. 2, 1930.  E. KASSNER  1,783,943
COMBINED DUPLEX ADDING MACHINE AND CASH REGISTER
Filed Jan. 8, 1927.  14 Sheets-Sheet 13
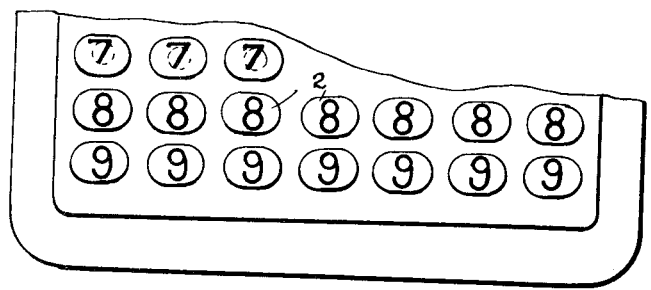
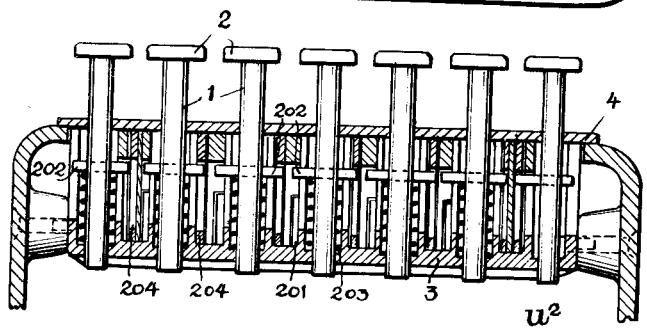
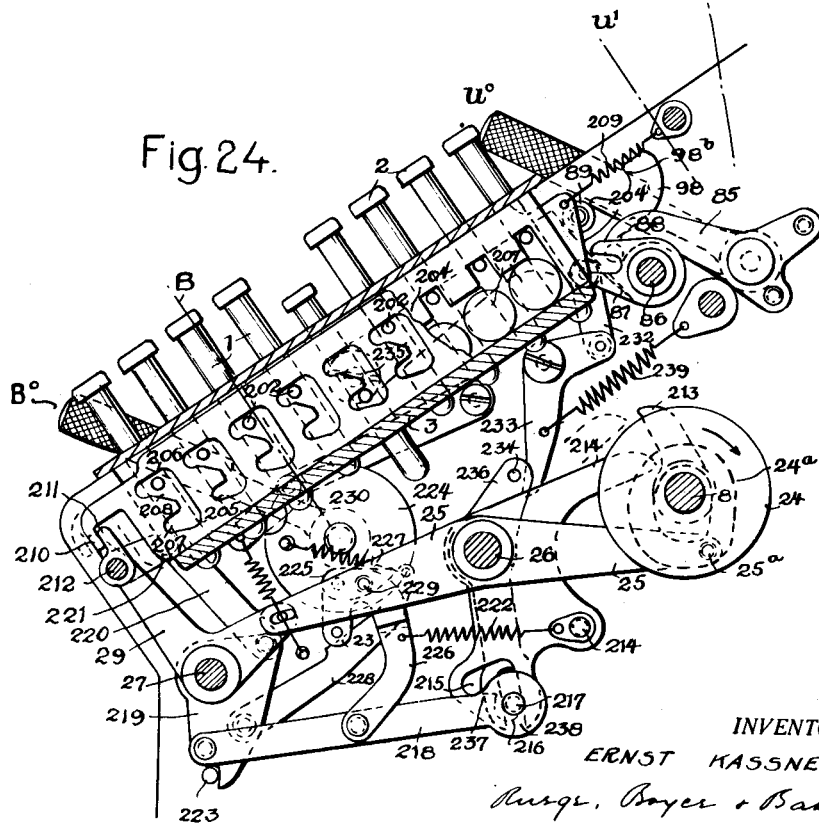
INVENTOR.
ERNST KASSNER,
ATTORNEY

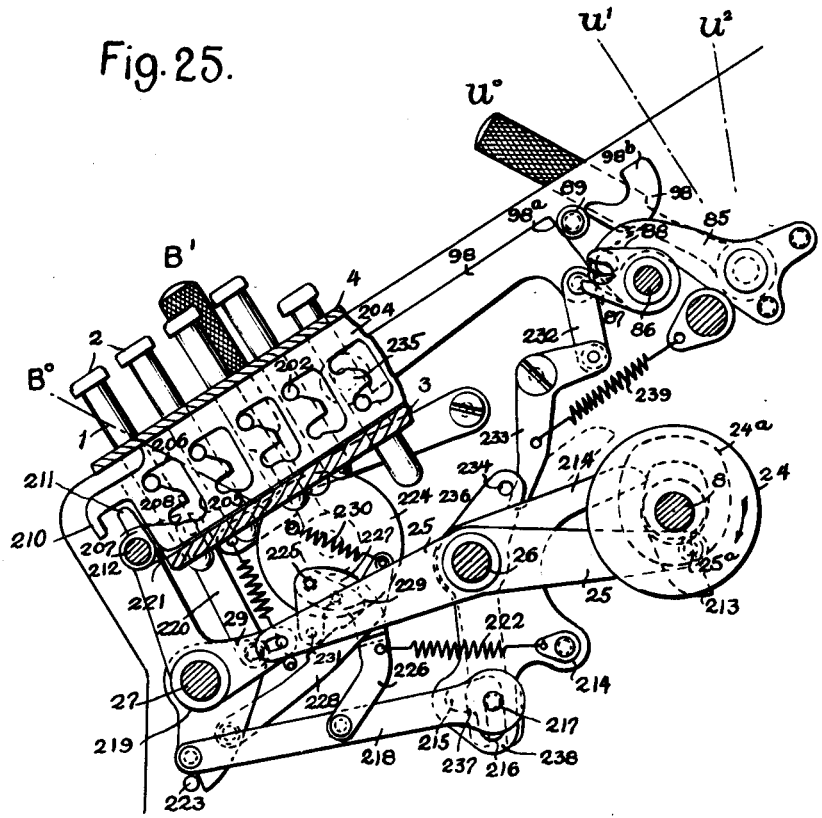

Patented Dec. 2, 1930

1,783,943

UNITED STATES PATENT OFFICE

ERNST KASSNER, OF BERLIN, GERMANY

COMBINED DUPLEX ADDING MACHINE AND CASH REGISTER

Application filed January 8, 1927, Serial No. 159,770, and in Germany June 7, 1924.

This invention relates to a combined duplex adding machine and cash register, i. e., a machine, which can be used both as a cash register that prints items and totals, and as an adding machine having two separate adding mechanisms. Machines of this general type are known. My novel machine differs from these known types principally in the fact that the manual setting of the machine for its various modes of operation is effected in an entirely novel manner which enables the machine to be very considerably simplified so that, instead of it being extremely heavy and unwieldy like most of the old types, a portable duplex adding machine and cash register is produced.

For example in previously known machines of this kind the manual setting of the same for their various modes of operation involved a separate manually operable key or lever for each mode of operation. An exceedingly complicated mechanism or gear results from this principle which can be only employed in large and heavy machines. Machines have been also proposed that function in the following manner: The one or the other adding mechanism of the machine is selected as desired for operation by a selecting member. Then, according as complete totals or sub-totals are to be printed the mode of operation of the selected adding machine is selected by means of a total key or sub-total key. Furthermore the transference of the calculated total from the one adding mechanism to the other is effected by means of a separate transfer key. This method of setting the machine for its different modes of operation also involves a very complicated mechanism and results in costly machines. Another point to be mentioned is that in most of these machines in order to cause all the complicated motions, particularly in totalizing, to be executed, it was always necessary to effect two revolutions of the crank to turn the main driving shaft, because it was impossible to accomplish all the necessary motions and functions by means of a single turn of the crank.

The novel machine is distinguished from all the known kinds of machines by the following features: For the setting of the machine for all its different modes of operation only two control members are required each of which can be thrown or moved into a number of positions. The different positions of the first control member and the various positions of the second control member give a certain number of possible combinations some or all of which are employed for setting the machine for its various modes of operation. By this means the mechanism or gear is very considerably simplified so that the novel machine can be made much lighter and cheaper than older machines capable of performing the same functions. In addition the novel method of selecting the different modes of operation greatly simplifies the work of the user of the machine as he or she has only to move two control members to select any of the various desired modes of operation of the machine. On account of the simplicity of its mechanism it is possible to complete all the motions required for an operation of the machine by means of a single turn of its main shaft, which was not feasible in the older machines.

In the table given hereinafter the various combinations of the two cooperating control members employed in the constructional form of the novel machine shown herein are set forth in the left-hand column under I–VIII. In the same column corresponding examples of the indications or amounts that appear in the windows or observation openings of the adding mechanisms and on the checking or recording strip are diagrammatically shown. In the right hand column are given eight modes of operation of the machine that correspond to the eight different combinations I–VIII of the control members.

*Positions or settings of control members*  
U and Z: Control members.

*Modes of operation*  
P = front adding mechanism (items).  
R = rear adding mechanism (results).

I  U in position $U^0$  
   Z in position $Z^0$

R  | 0 0 0 0 0 0 0 0 |

P  | 0 0 2 0 0 9 3 3 |

|  44 54 |
   | 654 56 |
   | 766 78 |
   | 543 45 |

*Item entering operation of the "P" adding mechanism and printing of the items set by the numeral keys*

Single line spacing on the record strip.  
No printing of distinguishing marks.  
No cutting of the record strip.  
No zeroizing of the P adding mechanism.

II  U in position $U'$  
    Z in position $Z^0$

R  | 0 0 2 0 0 9 3 3 |

P  | 0 0 0 0 0 0 0 0 |

|  44 54 |
    | 654 56 |
    | 766 78 |
    | 543 45 |
    | T 2 009 33 |

*Printing of totals from the P adding mechanism and transference of totals from the P adding mechanism to the R adding mechanism; also zeroizing of the P adding mechanism*

Six-line spacing on the record strip.  
T = printing of distinguishing marks.  
Cutting of record strip.  
Automatic zeroizing of the P adding mechanism.  
Automatic restoring of the control member U to its initial position.

III  U in position $U^2$  
     Z in position $Z^0$

R  | 0 0 0 0 0 0 0 0 |

P  | 0 0 2 8 2 4 0 1 |

|  44 54 |
     | 654 56 |
     | 766 78 |
     | 543 45 |
     | Z 2 009 33 |
     |  43 34 |
     |   4 56 |
     | 766 78 |
     | Z 2 824 01 |

*Printing of sub-totals from the P adding mechanism*

Six-line spacing on the record strip.  
Z = printing of distinguishing marks.  
No cutting of record strip.  
No zeroizing of the P adding mechanism.  
Automatic restoration of the control member U to its initial position.

IV  U in position $U^1$  
    Z in position $Z^3$

R  | 0 0 2 8 2 4 0 1 |

| 0 0 0 0 0 0 0 0 |

|  44 54 |
    | 654 56 |
    | 766 78 |
    | 543 45 |
    | L 2 009 33 |
    |  43 34 |
    |   4 56 |
    | 766 78 |
    | L  814 68 |

*Printing of totals from the P adding mechanism and transference of the P adding mechanism totals to the R adding mechanism and zeroizing of totals from the P adding mechanism (No cutting of record strip)*

Three-line spacing on the record strip.  
L = printing of distinguishing marks.  
No cutting of record strip.  
No zeroizing of the P adding mechanism.  
Automatic restoration of the control members U and Z to their initial positions.

V  U in position $U^2$  
   Z in position $Z^1$

R  | 0 0 0 0 0 0 0 0 |

P  | 0 0 0 0 0 0 0 0 |

|  44 54 |
   | 654 56 |
   | 766 78 |
   | 543 45 |
   | Y 2 009 33 |

*Printing of totals from the P adding mechanism and zeroizing of P adding mechanism*

Six-line spacing of the record strip.  
Y = printing of distinguishing marks.  
Cutting of record strip.  
Automatic zeroizing of the P adding mechanism.  
Automatic restoration of the control members U and Z.

| | | |
|---|---|---|
| VI | U in position $U^1$ | *Item entering oper-* |
| | Z in position $Z^2$ | *ation of the R add-* |
| | R  00940592 | *ing mechanism and* |
| | | *printing of the* |
| | | *items set by the nu-* |
| | P  00282401 | *meral keys, while* |
| | | *retaining sums in* |
| | | *the P adding mech-* |
| | | *anism if desired* |
| | I   7 656 78 | Single-line spacing |
| | I     654 00 | on record strip. |
| | I     344 30 | I = printing of dis- |
| | I       6 54 | tinguishing |
| | I     667 80 | marks at each |
| | I      76 50 | item. |
| | | No cutting of record strip. |
| | | No zeroizing of the P adding mechanism. |
| | | No restoration of the control members U and Z. |
| VII | U in position $U^2$ | *Printing of totals* |
| | Z in position $Z^4$ | *from the R adding* |
| | R  00940592 | *mechanism* |
| | | Six-line spacing on record strip. |
| | P  00282401 | X = printing of dis- tinguishing marks. |
| | I   7 656 78 | Cutting of record strip. |
| | I     654 00 | No zeroizing of the P adding mechanism. |
| | I     344 30 | |
| | I       6 54 | |
| | I     667 80 | Automatic restoration of the control members U and Z. |
| | I      76 50 | |
| | X   9 405 92 | |
| VIII | U in position $U^0$ | *Printing of sub-to-* |
| | Z in position $Z^4$ | *tals from the R add-* |
| | R  00940592 | *ing mechanism and* |
| | | *transference of the* |
| | P  01222993 | *R adding mecha-* |
| | | *nism totals to the P* |
| | 44 54 | *adding mechanism* |
| | 654 56 | |
| | 766 78 | Single-line spacing |
| | 543 45 | on record strip. |
| | Z  2 009 33 | No printing of dis- |
| | 43 34 | tinguishing marks. |
| | 4 56 | No cutting of rec- |
| | 766 78 | ord strip. |
| | Z  2 824 01 | No zeroizing of the |
| | I   7 656 78 | P adding mecha- |
| | I     654 00 | nism. |
| | I     344 30 | |
| | I       6 54 | Automatic restora- |
| | I     667 80 | tion of the control |
| | I      76 50 | member Z. |
| | 9 405 92 | |

Exact explanations of the diagrammatic indications in the left hand column and of the various modes of operation set forth in the right hand column will be found in the description of the machine given hereinafter.

The combined duplex adding machine and cash register is shown in one embodiment thereof in the attached drawings, in which Fig. 1 is a diagrammatic sectional view taken longitudinally of the machine and showing the speed regulating means in detail.

Fig. 2 shows the record strip carrier or bobbin partly in section.

Fig. 2a shows the construction of the auxiliary crank, partly in section and partly in elevation.

Fig. 2b is a section of the Fig. 2a on the line A—B.

Fig. 2c is a section of the Fig. 2b on the line C—D.

Fig. 3 shows the upper portion of the machine as illustrated in Figs. 1 and 2 and particularly the mechanism associated with the two control members U and Z on a larger scale.

Fig. 3a shows the manually operable key-controlled blocking-mechanism extracted from Fig. 3.

Figs. 4 and 4a show on an enlarged scale the setting members each consisting of a feeler and a type carrier, Fig. 4a being a front view and Fig. 4 a side view.

Figs. 5 and 6 show on an enlarged scale a front and side view respectively of the zero setting device shown in Fig. 4 for setting the type carriers in their zero printing position.

Fig. 7 shows on an enlarged scale a front view of the rocker frame for effecting the different operations of the adding mechanism.

Fig. 8 shows a vertical section on the line C—D of Fig. 7 showing the adding mechanisms on an enlarged scale.

Fig. 9 shows on an enlarged scale the numeral wheel systems of the two adding mechanisms illustrated in Fig. 2.

Fig. 10 is a front view of the arrangement shown in Fig. 9.

Figs. 11 and 12 show in two different positions the device for securing exact zeroizing of the front adding mechanism.

Fig. 13 shows the arresting and blocking devices that come into operation when the rear adding mechanism is zeroized and Fig. 14 is a view of the key used for effecting this zeroizing operation.

Fig. 15 shows the gear extracted partly from Fig. 2 and partly from Fig. 4 for transferring the movements or settings of the setting members (feelers and type carriers) to the adding mechanism.

Fig. 15a shows a setting member according to Fig. 15 with its feeler and type carrier in different positions from those shown in Fig. 15.

Figs. 16 and 16a show front and side views of the gear for transferring motion from the main driving shaft to the shaft that carries the feelers and type carriers.

Figure 17:
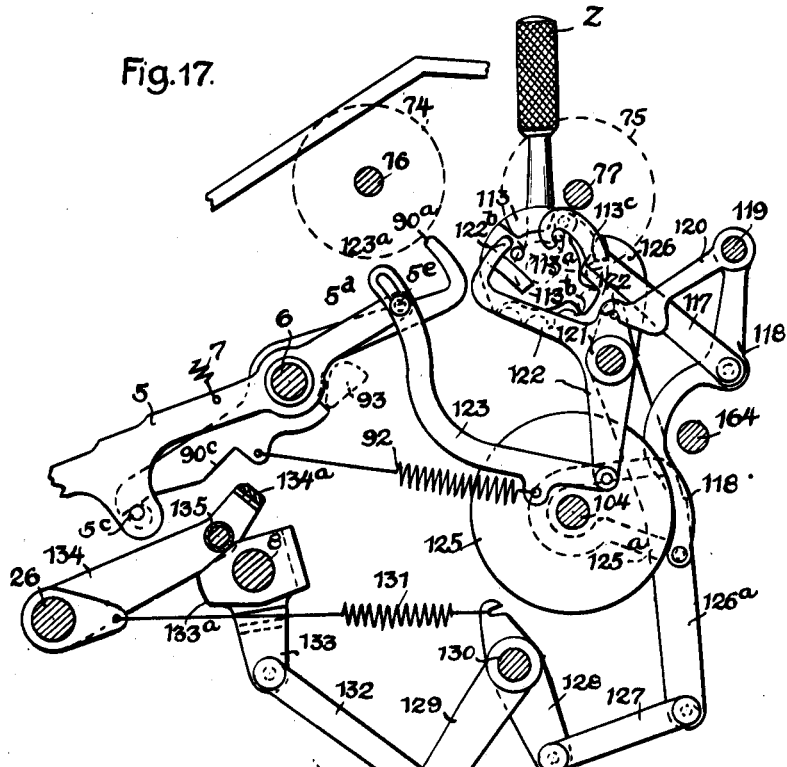

Fig. 17, which is extracted from Figs. 2 and 8, shows separately the gear for setting and transferring the totals indicated on the adding mechanism.

Figure 18:
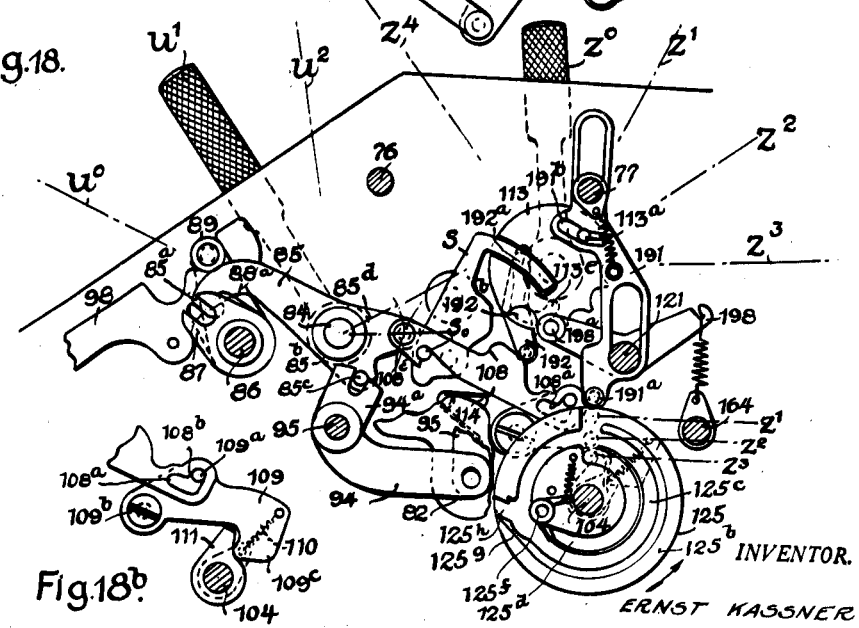

Fig. 18 shows the mechanisms for automatically restoring to their normal positions the two control members for setting the machine for various modes of operation.

Fig. 18a shows the gear of Fig. 18 in a different position.

Fig. 18b is a full line showing of a portion of the control member mechanism shown in dotted lines in Fig. 18.

Figure 19:
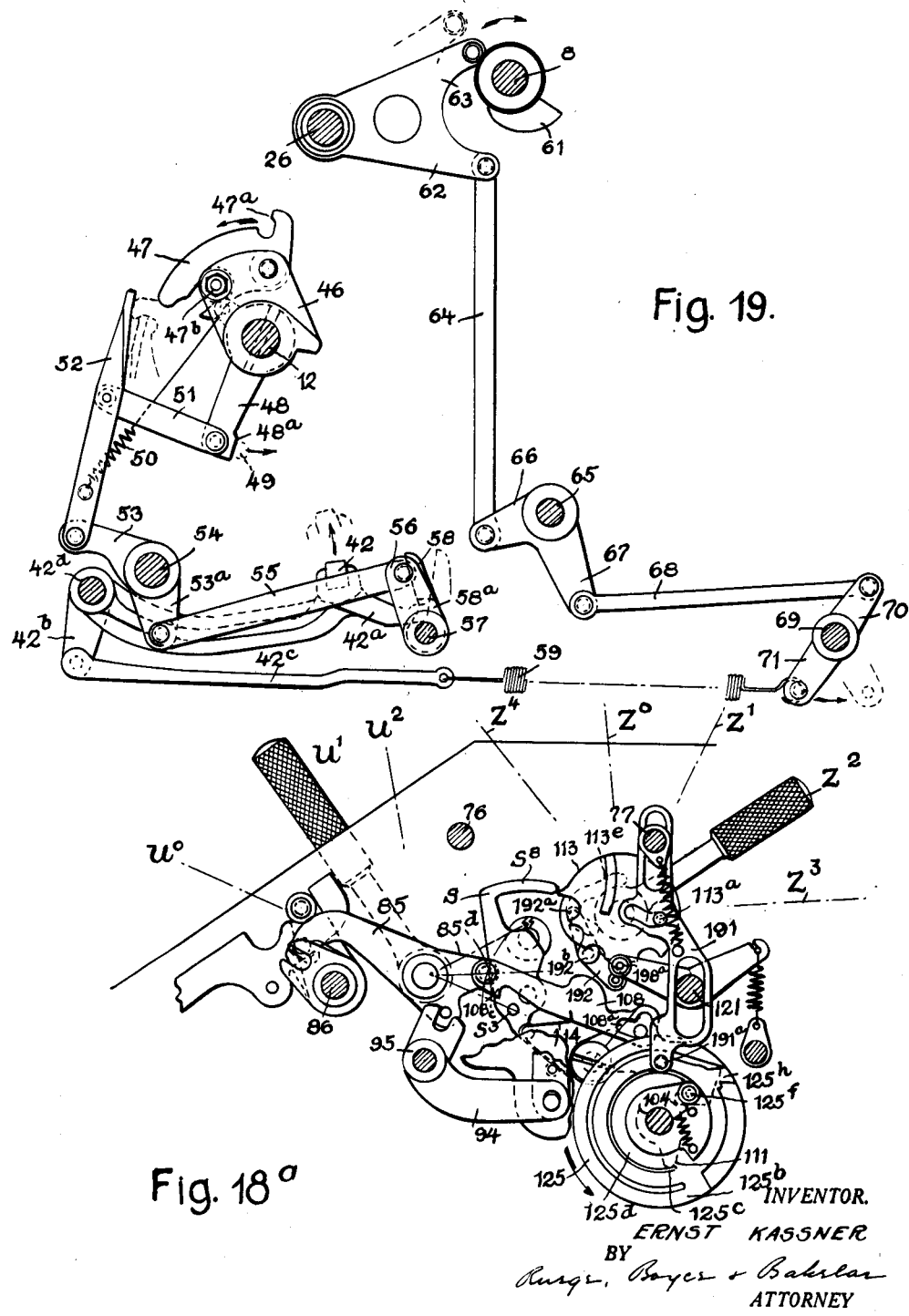

Fig. 19 shows on an enlarged scale the gear extracted from Fig. 1 for tensioning and releasing the printing hammer.

Figs. 20 and 20a show side and top views extracted from Fig. 8 of the coupling and uncoupling device for the automatic zeroizing mechanism of the front adding mechanism.

Figs. 21, 21a, 21b show two side views and a front view of a numeral wheel gear of the adding mechanism.

Fig. 22 is a top view of a part of the key-board.

Fig. 23 a cross section of the key-board and

Fig. 24 is a longitudinal section of the key-board with its key-locking and repeating devices.

Fig. 25 shows the devices of Fig. 24 in a different position.

Figs. 26, 26a, 26b show details of mechanisms attached to the wall of the machine that belong to the oscillatory crank.

Setting devices

Figure 4:
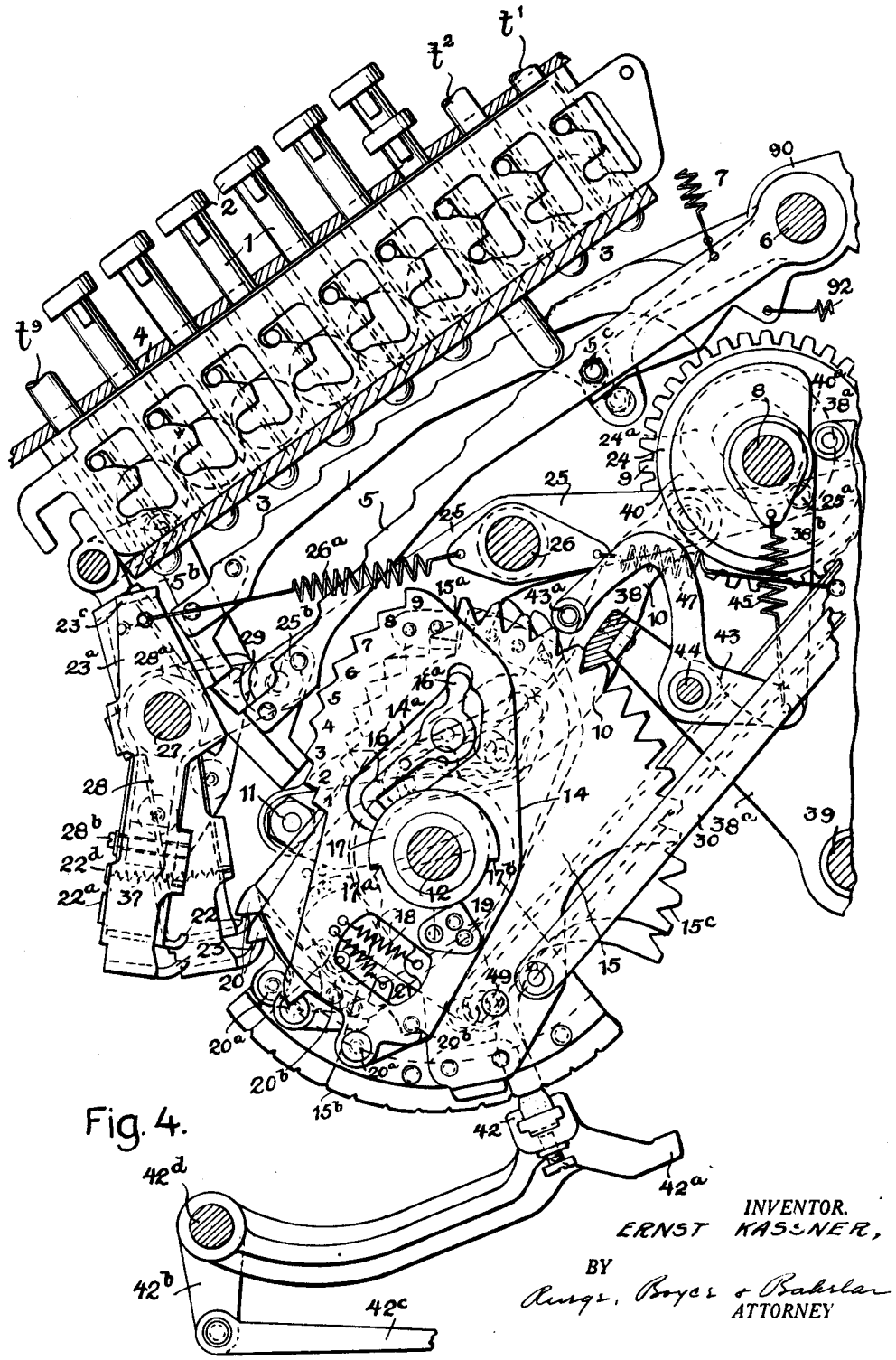

The key-board is shown in Fig. 4. For each digit or denomination there are nine keys $t^1$ to $t^9$ corresponding to the numerals 1 to 9. For the numeral "zero" no key is provided in the machine described herein, because the zero character sets itself for printing automatically as will be hereinafter described. The stems of the keys 2 are guided in holes in the bottom and top plates 3 and 4 of the key-board. When depressed the bottom end of a key stem contacts with a rocker arm 5 and moves the same downwards against the pull of a spring 7. The rocker arms 5, whose number corresponds to the number of digits, are arranged beside each other to rotate on the shaft 6. The upper edge of each rocker arm is stepped, there being nine steps corresponding to the keys $t^1$ to $t^9$. According to which of the associated keys is depressed, the rocker arm 5 is rocked downwards to a different extent.

The different settings or degrees of depression imparted to the rocker arms by the depressed keys are now "felt" or ascertained during a single revolution of the main driving shaft 8 of the machine. For this purpose each rocker arm 5 is provided at its free end with an arresting surface 5a that cooperates with the steps 1 to 9 of a feeler 14. The feeler 14 that turns on the carrier shaft 12 is shown separately in Figs. 15 and 15a. Associated with each feeler 14, one of which is provided for each of the digits, is a type carrier 15 that is provided at its bottom edge with ten types 15b for printing the numerals 0 to 9. The type carrier is mounted on the shaft 12 adjacent its associated feeler 14. In Fig. 4a all the feelers and their associated type carriers are shown adjacent each other on the shaft 12.

Each feeler 14 is connected with its associated type carrier 15 by a tension spring 18 which tends to turn the two members 14 and 15 around the shaft 12 in opposite directions so that the abutment 19a of a member 14 tends to rotate away from the abutment surface 15a of the member 15, as will be seen by comparing Fig. 15 with Fig. 15a.

The two members 14 and 15 are furthermore connected with each other by a coupling pawl 16 pivotally mounted on the member 15 and having an arm 16a arranged in a guide recess formed in a perforation 14a in the member 14. According to the angular positions of the two members 14 and 15 relatively to each other, the coupling pawl 16 will occupy different positions (see Figs. 15 and 15a), in which it is either in engagement or out of engagement with a coupling edge 17a of a coupling disk 17 fixed on the carrier shaft 12. Whenever the pawl 16 engages the coupling disk 17 the pawl limits the relative angular displacement of the members 14 and 15 to each other as indicated by the displacement angle $v$ Fig. 15a.

As already mentioned, motion is transmitted to the setting members 14 and 15 from a manually or electrically operated main driving shaft 8 by means of the crank drive shown separately in Figs. 16 and 16a. The toothed crank wheel 9 fixed on the main driving shaft 8 imparts a partial revolution to the shaft 12 by means of a crank rod 10 and a crank 11 fixed on the shaft 12. This partial revolution of the carrier shaft 12 causes the two members 14 and 15 to also execute a partial revolution as they are normally held by the spring 8 in the position shown in Fig. 15a in which the coupling pawl 16 couples them with the shaft 12. During this partial rotation, which is effected in a counter clockwise direction, one of the steps 1 to 9 of the feeler 14 strikes against the arresting surface 5a of the previously depressed rocker arm 5 (Fig. 4). Consequently the slight angular displacement $v$ (Figs. 4 and 15a) is eliminated so that the two members 14 and 15 occupy the relative positions shown in Fig. 15, in which the coupling pawl 16 is disengaged from the coupling disk 17. On further rotation of the main driving shaft 8 and the carrier shaft 12, the periphery of the coupling disk 17 glides past the bottom end of the lifted coupling pawl 16 so that no further rotation of the members 14 and 15 takes place.

The afore-described setting movement of the members 14 and 15 has to be transferred to the counting train or adding mechanism. This is accomplished by means of the following motion-transferring device: The connecting rod 30, which is pivotally connected with the type carrier 15$^b$ (Fig. 15), transfers the motion of the latter by means of pivoted links 32 and 33 to the toothed sector lever 34 which is mounted to rotate on the shaft 72. The toothed sector levers 34, which correspond in number to the number of digits, mesh with an equal number of intermediate gear wheels 73 and impart to them a lesser or greater rotary movement according to the numeral for which the setting member 15 has been set. The intermediate gear wheels 73 are carried by a shaft 97 mounted in a rocker frame 82, 83 (see also Fig. 7) and, as will be shown hereinafter, by means of the latter the wheels 73 can be brought into engagement with either one of the two adding mechanisms 74 and 75 (Figs. 8 and 15). By the means thus described the numbers recorded or set by the depressed keys are transferred to the one or the other of the adding mechanism according to the position into which the rocker frame 82, 83 is swung. It will be noted, that the types 15$b$ to be printed are also set by the setting of the type carrier 15$c$. The mechanism for operating the printing hammer (Fig. 4) will be described later.

The main driving shaft 8 executes a single revolution to impart all the movements required in the various mechanisms for a complete operation of the machine. During the second half of the revolution of the main driving shaft, the crank driving members 10, 11 (Figs. 4 and 16) turn the carrier shaft 12 back to its initial position. To compel the setting members 14 and 15 to participate in this return motion the coupling disk 17 is provided with a second coupling edge 17$b$. As will be seen in Fig. 15 the second coupling edge engages with an abutment 19 fixed to a feeler 14 and thus carries it around with it in a clockwise direction, whereby the abutment 19$a$ on the feeler 14 is caused to also turn the type carrier 15 clockwise to its initial position.

By the aforedescribed gear any multi-digit number, as for example 6238, can be set in the machine. But if one or more of the digits is zero, as for example in the number 6038 or in the number 6000, no key will be depressed for the said zero digits, but in spite of this the zero types of the corresponding digits or the associated type carriers 15 must be set automatically without the zero setting motions being transferred by the motion-transferring members to the adding mechanisms. This is effected by the following gear.

Blank and zero printing gear

Arranged before the entire row of feelers 14 and their associated type carriers 15 and mounted to turn loosely on the shaft 27 (Figs. 2 and 4) are the arresting levers 22, 23. For each digit there are two arresting levers 22, 23 which, as shown in Fig. 5, are placed one within the other. The two arresting levers 22, 23 of each digit are interconnected by a tensile spring 37 (Fig. 6), the spring causing the abutment 22$d$ (Fig. 5) of the lever 22 to bear against the lever 23. At their lower ends these arresting levers are each provided with a lip that cooperates with a dog pivotally mounted on a feeler 14 (Fig. 4). The dog 20 is rotated around its pivot 20$a$ by a spring 21 against a stop pin 20$b$ as shown in Figs. 15 and 15$a$. The lip of the arresting lever 22 holds the feeler 14 (Fig. 4) in its blank printing position i. e. in the position in which none of the printing types 0 to 9 can be reached by the printing hammer 42, so that in the initial or normal position of a feeler nothing will be printed on the record strip. The lip 23 of the arresting lever is provided for the purpose of holding the feeler 14 in a position, in which the associated type carrier 15 presents the type 0 to be printed by the striking of the printing hammer 42. Accordingly the arresting lever 22 will hereinafter be called the "blank lever", and the arresting lever 23 the "zero lever". Arranged within each of a pair of levers 22, 23 and mounted loosely on the carrier shaft 27 is a limiting lever 28 whose end is provided with a regulating screw 28$b$. Each pair of levers is pulled against the end of its associated regulating screw by means of a spring 26$a$ (Figs. 4 and 6), whose one end is attached to the zero lever 23$a$. By this means the abutment 23$b$ of the zero lever is made to strike against the said regulating screw. When the entire machine is in its initial or normal position the stop members 5$b$ of the rocker arms 5 are positioned before the top stop members 23$c$ of the zero levers 23 so that there is only a slight gap between said members 5$b$ and 23$c$, this gap being capable of exact adjustment by the regulating screw 28$b$.

As shown in Fig. 15 the shaft 27 upon which the limiting levers are fixed is arranged to be turned to a certain extent by the main driving shaft 8 by means of a cam disk 24, in whose cam groove 24$a$ a roll 25$a$ on the double arm lever 25 is guided. The double arm lever 25 is connected by a pin and slot connection 29$a$, 25$b$ to the bell crank lever 29 fixed on the shaft 27.

When the main driving shaft 8 executes one revolution from its initial position, illustrated in said figure, the limiting levers 28 are deflected clockwise and then back to their normal positions. The arresting levers 23, under the action of the springs 26a attached to the zero levers 23, tend to participate in these motions of the limiting levers. Consequently the following events will simultaneously occur, assuming that the number 303 has been previously set up on the key-board:

1. In the particular digits that lie before the depressed key, for example before the second digit in the aforesaid number 303, the arresting levers 23, and consequently also the levers 22, can only follow the movement of the limiting levers until the stop member 23c of each zero lever strikes against the stop member 5b of the associated rocker arm 5 that has not been depressed. As the gap between the two stop members is only very small and therefore the limiting levers 22 and 23 are only deflected by their springs very slightly, the feelers 14 are maintained by their dogs 20 that rest upon the arresting lips 22 of the blank levers in their initial positions, as illustrated in Fig. 4. Since the associated type carriers 15 also remain in their normal positions no numeral of the particular digit will be presented to the printing hammer for printing.

2. In all digits in which a key, and with it, the associated rocker arm 5 has been depressed as in the third and first digits of the number 303 assumed in the present instance, the arresting levers 23, by the action of their springs 26a, are caused to follow the deflection of their associated limiting levers 28. As the blank levers 22, due to their abutments 22d, are caused to participate in the movements of the zero levers 23, the arresting lips 22, 23 are moved out of the path of the dogs 20 of the associated feelers 14, so that the latter are enabled to rotate and to "feel" the positions of the associated depressed rocker arms 5 as described above. As seen in Fig. 4 for example the feeler 14 is turned until its step 3 strikes the arresting surface 5a of the rocker arm 5 so that the hammer 42 strikes against the fourth type of the type carrier 15, which has the numeral 3 embossed or engraved upon it.

3. Finally in the digits in which a zero is to be printed, as in the second digit in the present example, the following actions take place:

The zero lever 23 of the third digit in executing the motion described above under 2 strikes against the abutment 22ᵃ which extends over its edge from the neighbouring right hand blank lever 22 and carries this lever along with it while stretching the tensile springs 37 of that neighbouring lever. By this motion of the blank lever 22 all the other blank levers 22 lying towards the right are deflected by virtue of the overhanging abutments 22a and all their associated springs 37 are stretched as far as these blank levers have not been moved directly by their associated zero levers 23 striking against the abutments 22d as described under 2. In the second digit of the number 303 assumed no key has been depressed. Consequently the zero lever 23 (Fig. 4) has been locked against movement by the stop member 5b of the associated rocker arm 5, but not the blank lever 22. As just described this latter has been deflected so that its arresting lip 22 has been moved away from the dog 20 of the associated feeler 14, so that this feeler turns until its dog 20 reaches the arresting lip 22, as shown in Fig. 4. By this small rotary movement of the feeler the "0" type of the type carrier is brought into position for printing before the printing hammer.

If the number set up on the key-board has several zero numerals, as for example the number 6000, all of the blank levers 22 at the right of the fourth digit are automatically deflected by their springs 37, while the zero levers 23 are maintained in their normal positions. By this means the zero types in the third, second and first digit places are automatically set in their printing positions.

The above description can be summarized as follows:

In case 1 the two arresting levers 22, 23 are kept arrested in their normal positions (blank printing position). In case 2 both arresting levers are deflected (printing of numerals 1 to 9). In case 3 the blank levers 22 are deflected, while the zero levers 22 are kept arrested. (Printing of zero.)

Fig. 4 shows a first setting member comprising a feeler 14 and a type carrier 15 in its normal or initial position, in which it is held by the blank lever 22, a second setting member held in its zero printing position by the zero lever 23, and finally a third setting member held in the position for printing the numeral "3" by the rocker arm 5, which has been depressed by the key $t^3$. The position of the mechanism corresponds to that in which it is stepped for printing the number 303 selected in the example given above.

The small angle through which the type carriers 15 are rotated to present their zero types for printing must not be transferred by means of the rods 30 to the adding mechanisms. For this reason the rods 30 (Fig. 15), are connected to the links 32 by means of a pin and slot connection 32a, 30a so that there is an amount of lost motion at the said connection, which corresponds to the movements imparted to the rod 30 during the rotation of the type carrier 15 into its zero printing position. The tensile spring 35, connected at one end to the toothed sector lever 34 and at the other end to the rod 30, tends to hold the toothed sector lever 34 against an abutment in a form of the shaft 36 during the slipping of the pin 32a in the slot 30a, so that the friction in the pin and slot connection cannot effect a movement of the toothed sector.

When the arresting levers 23 and the setting members 14, 15 return to their initial positions the dogs 20, in contacting with the arresting lips 22 of the blank levers, are turned slightly clockwise against the action of the springs 21 until they pass the arresting lips, when they are pulled by their springs into their initial positions.

The tensile springs 26a have different tensions which correspond to the digit with which they are associated. For example the tension of the spring 26a belonging to the lowest digit is only strong enough to overcome the force of a single draught spring 37. The spring 26a of the fourth digit or denomination must be strong enough to overcome the total force of four draught springs 37. Finally the strength of the spring 26a belonging to the highest digit must be sufficient to overcome the pull of all the springs 37.

The variably depressible rocker arms 5 operated by the keys t are guided to prevent lateral play at their front ends in slots 28a (Figs. 5 and 15) which are formed in the hubs of the limiting levers 28.

*Lining up of the numerals on the type carriers set for printing and holding of the same*

Before the printing operation is carried out the numerals of the type carriers set for printing must be properly lined up and firmly held in their lined up positions. This is effected by means of a wedge-shaped bar or prism 38 (Figs. 2 and 4), attached to the end of one arm of a wheel crank lever 38a, 38b, mounted on the shaft 39. This bell crank lever is rocked by the main driving shaft 8 by means of a cam 40, on which travels a roll 38c journalled at one end of the bell crank lever. When, during the rotation of the main driving shaft, the travelling roll 38c is pulled by the spring 41 into the depression 40a of the cam, the prism 38 is forced into the wedge-shaped serrations 15c of all the type carriers 15 set for printing and thus effects the lining up of the numerals to be printed. The divisions or pitch of the wedge-shaped serrations 15c correspond exactly to the pitch of the types 15b. After the printing operation the prism 38 is raised from the serrations 15c again by the cam 40.

In order to accomplish a reliable fixing and setting of the type carrier 15 before the prism 38 is forced into the serrations 15c an arresting roll 43a is arranged on a bell crank lever 43, that is pivoted to rotate loosely on a shaft 44, which connects the arms 38a that carry the prism 38. The roll 43a is pressed against the teeth 15c by means of a spring 45.

*Operation of the printing hammer*

The printing hammer 42 which is journalled loosely on the shaft 42d (Figs. 1, 4 and 19) is released to allow it to strike the types by imparting a partial turn to the shaft 12 that carries the type carriers. Fixed to the right end of the shaft, as shown in Fig. 4a, is an arm 46, to which an arcuate pressure lever 47 is attached. The position of the latter on the arm 46 can be adjusted by an excentric screw 47b. Journalled loosely on the same shaft 12 is a feeler lever 48 whose striking surface 48a abuts on a pin 49 of the neighbouring type carrier 15, i. e. the type carrier belonging to the lowest digit. Consequently, if a key belonging to any digit has been depressed on the key-board, resulting as hereinbefore described in a lesser or greater rotary movement of all the type carriers to the right of the said digit amounting to at least the rotary movement required for setting the type carriers into their zero printing positions, the feeler lever is caused by the spring 50 to follow the movement of the pin 49 and thus moves the thrust rod 52 (Fig. 19) to the right by means of the connecting rod 51, so that the upper end of the rod 52 rests against the peripheral edge of the arcuate pressure lever 47. By this means the thrust rod 52 is brought into the path of the striking member 47a so that when a partial turn is imparted to the shaft 12 the thrust rod 52 is pushed downwards during the latter part of the said rotary movement of the shaft 12. This downward movement of the rod 52 is transmitted through the bell crank lever 53, 53a, connecting rod 55, lever 56 fixed on the shaft 57, to the arresting lever 58 which is also mounted on the shaft 57. The arresting lever 58, whose arresting surface 58a normally holds the arm 42a of the printing hammer 42 against movement now releases the printing hammer allowing it to be thrown against the types set for printing by a hammer throwing device which will be presently described.

If no key on the key-board is depressed, no rotary movement of the type carriers 15 will take place. Consequently the thrust rod 52 remains in its normal position and cannot effect the releasing of the printing hammer 42, even if a non-effective operation of the machine takes place.

The printing hammer 42 is connected through an arm 42b, that is fixed to the hammer, and through a draught rod 42c to a spring 59 (Fig. 19). This spring is alternately expanded and detensioned at the proper moments by the rotation of the main driving shaft 8 by means of the cam 61 and the two-armed lever 62, which acts in conjunction with the rod-and-lever gear 64, 66, 67, 68 on the two armed lever 70, 71. The spring 59 is connected to the ends of the lever 71. By this gear the spring 59 is tensioned whenever the prism 38 has just been forced into the serrations 15c of the type carriers 15 so that the printing hammer 42 is flung into its printing position by the action of the stretched spring 59. As soon as this printing action has taken place the arm 63 slips off the cam 61, thereby detensioning the spring 59, so that the printing hammer sinks down by its own weight into the position in which it is arrested by the arresting lever 58.

*The two adding mechanisms, their motion-transferring members and the control members*

As described above the type carirers 15 (Fig. 15) are connected by the motion-transferring members consisting of the rod 30 and links 32, 33 to the toothed sector levers 34, which are mounted loosely on the shaft 72 and mesh with the intermediate toothed wheels 73 so as to rotate the latter through an angle corresponding to the numerals set on the key-board. As will be described below these intermediate wheels 73 can be brought into engagement with the one or the other of the two adding mechanisms by rocking the rocker frame 82, 83. The front adding mechanism (numeral wheel 74) is the "P" adding mechanism (item adding mechanism) and the rear adding mechanism (numeral wheel 75) is the "R" adding mechanism (result adding mechanism). These functions of the two adding mechanisms can however be reversed if desired as will be explained below.

Each of these calculating mechanisms consists of eight numeral wheel systems (Figs. 9 and 10) which are mounted beside one another to turn on the shafts 76, 77 journalled in the side walls of the machine. The number of these numeral wheel systems can, however, be larger or smaller according to the number of digits for which the machine is arranged. Each numeral wheel system of the "P" adding mechanism consists, exactly like those of the "R" adding mechanism, of two members, which can be rotated relatively to each other, these members consisting as shown in Figs. 21 and 21a, of the numeral wheel 74 itself with a ratchet wheel 74b fixed thereon, and a pinion 74a rotatable with respect to the numeral wheel 74 and provided with a ratchet wheel 74c that is fixed to 74a. These two elements, which are rotatable relatively to the other, are coupled together by means of a spring pawl 74d pivoted on the numeral wheel 74 and engaging with the ratchet wheel 74c. The corresponding parts of the "R" adding mechanism are similar to those of the "P" adding mechanism just described.

When the intermediate wheel 73 (Figs. 8 and 9) is rocked to the right and thus brought into engagement with the pinion 75a of the corresponding wheel system, the rotation transmitted from the intermediate wheel 73 to the pinion 75a is transferred by the pawl 75d to the numeral wheel 75. On the intermediate wheel 73 thereupon rotating in the opposite direction the pawl 75d slips over the teeth of the ratchet wheel 75c that is being turned back, while the numeral wheel 75 is held in the position in which it has been turned by the holding pawl 79, which is pulled by a spring 81 so as to engage with the teeth of the ratchet 75b.

Similar operations take place, when the intermediate wheel 73 engages with the "P" adding mechanism. The holding pawl 79 with its spring 81 of the "R" adding mechanism corresponds to the holding pawl 78 with the spring 80 of the "P" adding mechanism.

The intermediate wheels 73 arranged between the two adding mechanisms are mounted in a rocker frame consisting of the two plates 82 and 83 (Fig. 7) and shafts connecting the two plates. The said rocker frame is arranged to rock on pivots 82a, 83a located in the side walls of the machine.

The rocking of this rocker frame is effected by means of the control member U (Fig. 3), which is arranged outside the casing of the machine and fixed to a stub shaft 84. When the control member U is rocked between the positions $U^0$ and $U^1$, this rocking motion is transferred by means of the curved arm 85 fixed on the stub shaft 84 to the shaft 86 by means of a pin 85a on the arm 85 that engages with a slot in an arm 88. The partial turn thus imparted to the shaft 86 results in a rocking movement of the arm 87 fixed to the shaft 86 and thereby a pin 82b (see Fig. 7) fixed on the one plate 82 of the rocker frame is moved through a corresponding angle.

By this means the throwing of the control member U causes the rocker frame to swing to the left or right, so as to cause the intermediate wheel 73 to engage with the one adding mechanism or the other. In each of these positions the rocker frame is securely held by means of the arresting arm 89, which is fixed on the shaft 86 and has a roll on its upper end (Fig. 3) which enters into recesses in a spring arresting lever 98 so as to secure the rocker frame, and consequently also the intermediate wheels 73 against undesired movements.

*Item entering operation of the "P" adding mechanism.—Mode of operation I*

As pointed out in the preamble an important feature in the operation of the new machine is the cooperation of only two control members, viz. the two members U and Z (Fig. 3), each of which can be thrown into a number of positions, the combinations produced by the two members in different co-operating positions giving rise to different operations of the machine. In its normal position $Z^0$ (Figs. 2 and 3) the control member Z is out of engagement with the mechanism of the machine, but the member U affects said mechanism in all of its positions. The mode of operation will now first be described which corresponds to the positions $U^0/Z^0$ of the two control members.

As hereinbefore described the rocker frame 82, 83 is swung to the left when the member U is in its position $U^0$ so that the intermediate wheels 73 are in engagement with the P adding mechanism. This corresponds to the mode of operation I set forth in the above table, i. e. the mode of operation entitled: "Item entering operation of the P adding mechanism and printing of the items set by the numeral keys." Every single or multi-digit number set up on the keyboard is transferred to the P adding mechanism and also printed on the recording strip. This is clearly diagrammatically set forth in the above table. Printed beneath each other on the record strip are the items

```
     44 54
    654 56
    766 78
    543 45
```

As the adding mechanism continually adds the items together the sum of these items viz.

```
   2 009 33
``` appears in the observation opening or window of the P adding mechanism.

The R adding mechanism is inoperative so that no number appears in its observation opening, as will be seen in the diagram of the table. From this diagram it will be noted further that the record strip is not cut off at its bottom end, but is presented for the impression of any desired number of additional items. For the same reason no zeroizing of the P adding mechanism takes place. Single-line spacing of record strip is effected.

By the mode of operation described, any desired number of items can be printed on the record strip and automatically added together in the manner required in book-keeping, accounting etc. This mode of operation is particularly useful when used in conjunction with the mode of operation II for cash registration purposes in trading establishments, shops or the like as will be seen under the next heading.

*Printing of totals from the P adding mechanism and transference of totals from the "P" adding mechanism to the "R" adding mechanism.—Mode of operation II*

When the control member U is thrown from its initial position $U^0$ into its second position $U^1$, so that the two switches are in the position $U^1/Z^0$, the rocker frame 82, 83 is rocked as described above so as to bring the intermediate wheels 73 into engagement with the R adding mechanism.

As indicated in the heading, in this mode of operation the totals set up in the P adding mechanism, which were obtained by the mode of operation I, are to be printed on the record strip and transferred automatically to the R adding mechanism without any further setting of the keys on the keyboard. To accomplish this the following devices are provided:

Arranged between the numerals on the numeral wheels of the P adding mechanism (and also of the R adding mechanism) are radial slots or recesses 74$f$ (Fig. 8). These slots are of different depths corresponding to the different extents of travel of the rocker arm 5 for the numerals 1 to 9. Diametrically opposite to each numeral appearing in the observation opening 74$e$ is a corresponding slot 74$f$ in the periphery of the numeral wheel. Arranged to dip into the slots 74$f$ is the end 90$a$ of a double-ended feeler lever 90, which turns loosely on the shaft 6. The number of these feeler levers is equal to the number of digits or denominations, that is, if there are ten keys in one row from plate to plate, then there must be ten feelers, one for each key. In other words, there will be one feeler for every wheel (74). Each feeler lever is acted upon by a spring 92 which tends to pull the feeling member 90$a$ against the numeral wheel. As long as the member U was in its position $U^0$ the arresting bar which is mounted in the rocker frame and fixed to the plates 82 and 83 as shown in Fig. 7, 93 was pressed against the arresting surfaces 90$d$ of all the feeler levers and held their feeling members 90$a$ out of engagement with the numeral wheel 74, as illustrated in Figs. 2 and 17. But when the member U is rocked into its position $U^1$, the arresting bar 93 is swung upwards to release the feeler levers 90 and allow their springs 92 to dip them into the slots of the numeral wheels that correspond to the numerals appearing in the observation openings, see Fig. 8. This setting of the feeler levers 90 is transferred by their lower ends 90$d$, by means of the excentric screws 5$c$, (which are provided for adjusting purposes) to the stepped rocker arms 5, these arms being thus depressed as if they had been depressed by keys of the keyboard. The sum indicated or set in the P adding mechanism is thus transferred to the setting members 14 and 15 and printed on the recording strip when the main shaft is turned, in exactly the same manner as already described above, but without any of the keys in the keyboard being depressed. The type carriers 15 moreover transfer the sum printed on record strip by means of the intermediate gear 30, 32, 33, 34 to the intermediate gear wheels 73 which, in turn, transfer that sum to the R adding mechanism. In this manner the sum or indication which previously appeared in the P adding mechanism is transferred to the R adding mechanism, while the P adding mechanism is automatically zeroized in a manner described hereinafter. Shortly before the main driving shaft completes its revolution of 360 degrees the switch U is automatically returned from its position U¹ into its normal position U⁰, as will also be described hereinafter.

The aforedescribed mode of operation is clearly set forth in the above table under II.

The record strip bears the same items as in the mode of operation I except that the total of these items, viz. 2 009 33, appears beneath them. Beside the total a distinguishing mark which distinguishes this mode of operation appears on the record strip. The same total appears in the observation opening of the R adding mechanism, while the P adding mechanism has been automatically zeroized.

In this mode of operation the record strip is automatically cut beneath the total. To avoid a close proximity of the cut edge to the total, a six-line spacing of the record strip is effected in the mode of operation II, instead of the smaller spacing of the mode of operation I. The record strip is cut in the middle of the six-line spacing, so that in the next operation the first item is printed at a corresponding distance from the upper edge of the strip. As shown in the diagram under II a sufficiently broad blank margin is therefore left both at the top and the bottom. The feed movement of the record strip, the printing of the distinguishing marks and the cutting of the record strip form features of a copending patent application.

The two modes of operation I and II belong together and constitute the cash registrating functions of the machine. By these functions a dealer or shopkeeper is enabled to provide the purchaser with a particularized account of his purchases upon a section of the record strip. As the total printed on this account has been simultaneously transferred to the R adding mechanism and continuously added to the other totals of purchases, the proprietor of the machine is enabled to read the general total, i. e. the total of the day's takings in the R adding mechanism.

*Printing of sub-totals from the "P" adding mechanism.—Mode of operation III*

The mode of operation III set forth in the above table, and which will now be explained, is effected when the control member U is thrown into its position U², while the control member Z is retained in its initial position, the combination setting of the control members thus being U². Z⁰. The diagram given in the table under III shows clearly the difference between this mode of operation and the mode of operation II. The total of the individual printed items, which in the mode of operation I appears in the observation opening of the P adding mechanism, shall not be transferred to the R adding mechanism as in the mode of operation II, but shall be kept in the P adding mechanism, no zeroizing of the latter and no cutting of the strip being effected. Consequently by this mode of operation III it is possible to print further items on the record strip, the P adding mechanism continuing its adding operations and causing the entire total of all the printed items to be printed when desired.

This mode of operation is accomplished when the member U is moved from its position U⁰, in which a continual working of the P adding mechanism took place (mode of operation I), into its position U². By this movement of the control member the intermediate wheels 73 (Fig. 8) are lifted from their position indicated by solid lines, in which they engage with the R adding mechanism, into the position A indicated by broken lines, and in which they are out of engagement with the toothed sectors 34. In this position of the mechanism the feeler levers 19 transfer the totals, ascertained or "felt" by the feeler members 902, to the type carriers 15 and thus enable the total that appears in the observation opening of the P adding mechanism to be printed when the main driving shaft is turned. But since the intermediate wheels 73 are lifted clear of the toothed sectors 34 the said total is not transferred to the R adding mechanism, but is retained in the P adding mechanism because, as will be shown hereinafter, no zeroizing of the P adding mechanism takes place in the position of the switches now under consideration.

The gear or mechanism by which the intermediate wheels 73 are thrown out of engagement with the toothed sectors 34 operates as follows: When the member U is thrown out of the position U⁰, in which by the mode of operation I, an item entering operation of the P adding mechanism took place, into the position U², it passes through its intermediate position U¹. By this motion the rocker frame 82, 83 is rocked towards the R adding mechanism as explained above. During the further travel of the control member from U¹ to U² the pin 85a attached to the curved arm 85 moves out of the slot in the arm 88 as the right hand limb 88a beside this slot is shorter than the other limb as clearly shown in Fig. 18. Consequently the rocker frame is not rocked further towards the right, but remains where it is, secured by the arresting lever 98. A pin 85c, however, which is fixed to the lower short arm 85b of the curved arm 85 (Figs. 3 and 18), now enters a guide slot in a bell crank lever 94, 94a, the one limb of this slot being also shorter than the other. When the control member turns further into its terminal position U² its motion effects the raising of the lifting bar 95 by means of the bell crank lever 94, 94a. This lifting bar 95, as will be seen from Figs. 3 and 7, forms an independent lifting frame 95, 96 which is arranged to be shifted up and down in the rocker frame 82—83 and carries the carrier shaft 97 of the intermediate wheels 73 at its upper end. By the said lifting motion the intermediate wheels 73 are lifted out of engagement from the toothed sector levers 34. The lifting frame 95, 96 has guiding slots 95b (Fig. 3) and 96b (Fig. 8) at the carrier shaft 72 which bears the toothed sector levers 34. Furthermore the ends of the shaft 97, that carries the intermediate wheels 73, are guided in curved slots in the rocker frame 82, 83. The center of the curves of these slots is the center of the shaft 77 of the R adding mechanism, so that when the intermediate wheels 73 are lifted out of engagement with the toothed sectors, they roll a short distance around the toothed wheels 75a of the R adding mechanism without being disengaged from the same. In their lifted positions the intermediate wheels 73 are held by arresting members 115 that enter into their teeth as shown in Fig. 8.

The lifting frame 95, 96 is held in its raised position (Figs. 3 and 7) in the following manner: Pivoted by means of a pivot 101b on the wall or cheek 82 of the rocker frame is a holding member in the form of a bell crank lever 101 which is pulled by a spring 100 against a stop pin 95a fixed on the lifting bar 95. Hence, when the lifting bar is raised, it is secured in its raised position by the holding pin 95a being embraced by the recess 101a in the holding lever 101. The lifting bar is also secured in its raised position by the rod or bar 99 being raised by the lever 94, so that the slot at the upper end of the bar 99 positively holds the holding lever 101 in its holding position.

It will now be understood that the gear just described enables the mode of operation III, i. e. the printing of sub-totals from the P adding mechanism, to take place. The diagram given in the table under III clearly indicates this mode of operation of the machine. As in the case of the mode of operation I the control members are first thrown into their position U⁰/Z⁰ whereby the items are obtained as in function I. Then the control members are thrown into position U²/Z⁰ whereby the first sub-total 2,009,33 is printed on record strip, without depression of any of the keys in the keyboard, when the main driving shaft 8 is turned one revolution. Now the control members are thrown back into position U⁰/Z⁰ (mode of operation I) and an item entering operation of the P adding mechanism is effected, i. e. further items are printed on the record strip which continually add on to the previous total in the P adding mechanism. The control members being now thrown into position U²/Z⁰, and the crank of the machine being turned, the entire total of all the items, i. e. the number 2 824 01 in the case assumed, is printed on record strip. If the computation is now terminated, this sum will be the final total, otherwise it will represent a sub-total. At each sub-total, in this mode of operation, the character Z is printed as a distinguishing mark. No cutting of the strip and no automatic zeroizing of the P adding mechanism takes place. After each sub-totalizing operation the record strip is automatically fed forward to the extent of six lines. The control member U is automatically restored to its initial position after each sub-totalizing operation as will be described hereinafter.

From the mode of operation just described it will be seen that it exceeds the functions I and II of a cash register. This mode of operation III is adapted for pure calculating operations, as for adding together the items in books on different pages of the same. Each of the sub-totals on the recording strip represents the amount to be carried forward, i. e. the total at the bottom of one page that is to be brought forward to the next page of the book.

*Positions of control members as in II but without cutting of the record strip.—Mode of operation IV*

In the mode of operation II, in which totals from the P adding mechanisms are printed and the total is transferred to the R adding mechanisms, while the P adding mechanism is zeroized, the record strip is cut off whenever the total is printed. The mode of operation now under consideration differs from the aforesaid only in the fact that the cutting of the strip does not take place. This is clearly indicated in the diagram under IV in the above table. The first group of numbers with the printed total 2 009 33 is the same as in the mode of operation II. Then follows another series of items which, to facilitate comparison, are chosen so as to coincide with the items selected in describing the mode of operation III. The difference from III consists in the fact that the second series of items are totalized separately and their total 814 68 are printed on the record strip. In this manner any desired number of separate calculations can be carried out on the record strip. The various sub-totals add to each other automatically in the R adding mechanism. In the example set forth in the diagram, the sum 2 824 01 appears in the R adding mechanism as the general total of the two sub-totals 2 009 33
814 68
———
2 824 01

The positions of the two control members U and Z of the aforedescribed mode of operation IV differ from those of the mode of operation II in the fact that the member Z is thrown from its position $Z^0$ into its position $Z^3$. By this motion of the second member Z, the strip cutting mechanism which cuts off the record strip and which is described in detail in the aforementioned patent application, is affected in such a way that no cutting of the strip takes place.

The record strip is fed forward as described in the said copending application so as to provide a three-line spacing. At each sub-total a distinguishing mark L is automatically printed to distinguish this particular mode of operation. At each sub-totalizing operation the P adding mechanism is automatically zeroized in the manner to be described hereinafter. The two control members U and Z are returned to normal $U^0/Z^0$ at each sub-totalizing operation, as will be described hereinafter.

The manner in which the general total that appears in the R adding mechanism can also be printed on the record strip will appear in the consideration of the mode of operation VIII.

Printing of total from the P adding mechanism and zeroizing of P adding mechanism.—Mode of operation V The mode of operation V is used after an item entering operation of the P adding mechanism (mode of operation I) to print the total from the P adding mechanism on the record strip and to simultaneously zeroize the P adding mechanism without affecting the R adding mechanism in any way. Hence additions which were previously carried out on the R adding mechanism can be retained in the same and continued later so that the entire machine is, as it were, divided into two separate calculating machines.

The diagram in the above table under V clearly represents this mode of operation. To facilitate comparison the same figures are shown as in the mode of operation I and II. In the mode of operation II the total 2 009 33 of the various items is printed on the record strip and transferred to the R adding mechanism, while the P adding mechanism is zeroized, but in the mode of operation V now under consideration the total is printed on the record strip and the P adding mechanism is zeroized, but no transference of the total to the R adding mechanism takes place.

The diagram in the table shows zero in the R adding mechanism, but instead of this any other number could appear in the observation opening because, as already mentioned, both calculating mechanisms operate quite independently of each other.

This mode of operation is effected by throwing the control members as follows: After effecting an item entering operation of the P adding mechanism by the mode of operation I the member U is thrown into position $U^2$. By this means the intermediate wheels 73 are lifted into their position A, i. e. the R adding mechanism is removed from the influence of the P adding mechanism. Furthermore the member Z is thrown into position $Z^1$. By this means a gear is thrown into action which causes the P adding mechanism to be zeroized when the main driving shaft is turned. The gear by which this is effected will be described later. At any rate it will now be clear that with control members in the position $U^2/Z^1$ the printing of the total from the P adding mechanism and the zeroizing of the latter is effected without influencing the R adding mechanism.

In this mode of operation V a cutting of the strip takes place as in operation II and therefore a six-line spacing of the record strip is effected. The distinguishing mark that appears besides the printed total consists of the character Y. During the latter part of the revolution of the main driving shaft an automatic restoration of the two control members to their normal positions $U^0$ and $Z^0$ takes place. The gear by which this is effected will also be described later.

In this position $U^2/Z^1$ of the control members the machine can also be used to cut off the record strip after previous operations I and II, in cases in which the calculations on the record strip are to be concluded. As indicated by the diagrams under I and III, the record strip is continuously fed forward in the mode of operation V to continue recording further individual items and the sub-total (distinguishing mark Z). The lowermost intermediate total is always the general total of all the items which appears in the observation opening of the P adding mechanism. If, after several intermediate totalizing operations have been effected, and finally the last individual items have been printed on the strip, a general totalizing operation is to be effected and the calculation concluded, the control members are thrown from the mode of operation I, not into the position of the mode of operation III, but directly into their positions $U^2$ and $Z^1$ in which they set the corresponding combination devices for causing the machine to effect the mode of operation V. In this case the general total, with the distinguishing mark Y, is printed on the record strip, the strip is cut, and the P adding mechanism is zeroized.

Item entering operation of the R adding mechanism.—Mode of operation VI

A feature of the modes of operation I–V hereinbefore described was the continual working of the P adding mechanism, the individual items set up by the keys on the keyboard being automatically printed on the record strip. The modes of operation will now be described in which, instead of an item entering operation of the P adding mechanism, an item entering operation of the R adding mechanism takes place. This mode of operation will be employed for example in cases in which book-keeping transactions have been previously carried out in the P adding mechanism, and when it is desired to proceed with intermediate calculations of a different kind on the machine without interrupting the calculations executed with the aid of the P adding mechanism, i. e. without zeroizing the latter adding mechanism.

The diagram represented in the table under VI shows as an example six individual items on the record strip beneath one another, viz.

```
I 7 656 78
I   654 00
I   344 30
I     6 54
I   667 80
I    76 50
``` whose total is 9 405 92

This total appears in the observation opening of the R adding mechanism. In the P adding mechanism is stored the number 2 824 01 which represents a total obtained for example by the mode of operation III. On the record strip the distinguishing mark I has been automatically printed beside each item to draw the attention of the user of the machine to the fact that the items emanate from the R adding mechanism.

In this mode of operation no cutting of the strip and no zeroizing of the P adding mechanism takes place. Similarly as in the mode of operation I, no automatic restoration of the switches takes place, because for the time being the continual working of the adding mechanism shall be not prevented. The manner in which this is accomplished contrary to all the other modes of operation will appear hereinafter in a special section of the specification.

To set the machine for this mode of operation, the intermediate wheels 73 must first be rocked to the right into engagement with the R adding mechanisms by throwing the switch U into its position U¹. By this means a direct actuation of the R adding mechanism by means of the settings of the keys is rendered possible. If, in this position of the switch U, the switch Z were to remain in its position Z⁰ as in the mode of operation II, the feeler levers 90 would "feel" the number wheels of the P adding mechanism by means of their feeler members 90a when the main driving shaft is operated and thereby the total indicated in the P adding mechanism and the transference of this total to the R adding mechanism would take place. This, however, must be avoided. That is to say, in the mode of operation VI under consideration, the feeler levers 90 must be locked even though the stop bar or prism 93 has released the feeler levers on account of the rocker frame having been swung to the right. To accomplish this locking of the feeler levers 90 the second control member Z is thrown into its position Z². By this means the following mechanism is operated:

When the control member Z is moved from its initial position Z⁰ (Figs. 3 and 17) into the position Z² the extended or cam portion 113c of the arresting disk 113 fixed to the control member Z causes the upper arm of the double arm lever 126 loosely pivoted on the shaft 121 to turn towards the right. The upper arm of the double arm lever 126 has two cam engaging surfaces. As shown in Fig. 3, the upper projecting surface may be engaged by cam 113b, which is mounted on disk 113, and the lower recessed surface is engaged by the cam portion 113c of the disk 113. Thus when control member Z is in its position Z⁰, the upper arm of the double arm lever 126 is as far to the left as it can go. When the control member Z is moved into its positions Z¹ or Z² the action of cam portion 113c on the lower recessed cam engaging surface of the upper arm of lever 126 moves the upper arm to the right. Similarly, when Z is moved from Z⁰ to Z⁴ the cam 113b engages the upper projecting cam engaging surface of the upper arm of the lever 126 so as to also move the upper arm to the right, as will be described later in connection with another mode of operation of the machine. This movement of the upper arm is transferred by means of the lower arm 126a, connecting rod 127, bell crank lever 128, 129, connecting rod 132 and lever 133 to the cam 133a (Fig. 8) which turns loosely on the main driving shaft 8. By the clockwise rotation of this cam 133a the rocking frame 134, whose roll 135a bears against the cam 133a, is swung round so that its stop bar 134a contacts with the arresting surfaces 90c of all the feeler levers 90. Consequently the latter are moved out of engagement with the numeral wheels of the P adding mechanism and locked. The tensile spring 131 connected to the bell crank lever 128, 129 tends to keep the upper end of the double arm lever 126, 126a in contact with the arresting disk 113. It may be mentioned here that this disk is held in its various positions imparted to it by the movements of the control member Z by a holding roll 198a which is attached to a double arm holding lever 198 (Figs. 3 and 18). The holding roll 198a is forced into recesses in the arresting disk 113 by the action of a spring.

It is thus seen that by the mechanism just described the feeler levers 90 are maintained

Printing of total from the R adding mechanism.—Mode of operation VII

The mode of operation VII is an adjunct to VI and the purpose of the same is to print on the record strip also the total of the items which were printed in the mode of operation VI, i. e. during the continual working of the R adding mechanism, and to cut off the record strip. This is clearly represented in the diagram of the table under VII as will be seen by comparison with the diagram VI. Beneath the column of items their total 9 405 92 is printed, together with the adjacent distinguishing mark I. A six-line spacing of the record strip is effected, for, as just mentioned, the strip is cut off. No zeroizing of the P adding mechanism takes place. After the totalizing operation the two control members are automatically restored to their normal positions U⁰/Z⁰.

This mode of operation is accomplished by throwing the control members into the position U²/Z⁴. By throwing the control member U to position U² the intermediate wheels 73 are raised into position A (Fig. 8) out of engagement with the toothed sectors 34, so that all further operation of the adding mechanism is prevented. Furthermore the switch Z is moved from its position Z⁰ into position Z⁴ (Figs. 3 and 17). By this means the following gear is operated:

When the control member Z is moved as described the pin 113a on the arresting disk 113 of the control member pulls the hooked connecting bar 117 along with it. This latter imparts a partial turn to the shaft 119 by means of the lever 118. Fixed to the shaft 119 is a number of holding arms 120, one for each digit or denomination of the machine. When the shaft 119 is turned as described these holding arms 120 (Fig. 17) are raised from the holding pins 122a of the bell crank lever arms 122, whose feeler members 122b can now be pulled by the springs 92 against the peripheries of the numeral wheels 75 of the R adding mechanism, so that they may dip into the radial slots 75f (Fig. 8) of the numeral wheels. These radial slots 75f correspond to the slots 74f of the P adding mechanism, the only difference being that they are not displaced with respect to the numerals appearing in the observation opening 75a by 180 degrees, but only by about 130 degreees. The dipping or setting motion of each feeler arm of lever 122 is transferred by means of the curved transferring bar 123 to the arm 5d of the associated rocker arm 5. In this manner these rocker arms are moved in accordance with the numbers set up in the R adding mechanism or appearing in the observation opening, just as if they had been moved by the depression of keys. Therefore when the main shaft is revolved the setting members, consisting of the feelers 14 and the type carriers 15, move into positions in which they present to the record strip the total that appears in the observation opening of the R adding mechanism. The said motions of the type carriers are transferred by the intermediate gear 30, 32, 33 to the toothed sectors 34, but this motion of the sectors has no effect because as already stated, the intermediate toothed wheels 73 are lifted out of engagement with the sectors 34 by the throwing of the control member U into its position U². In this way the total represented in the diagram VII of the table is printed on the record strip.

As shown in Fig. 17 the curved motion-transferring bar 123 is connected to the arm 5d of the stepped rocker arm 5 by a pin and slot connection 5e, 123a. This serves for the following purpose:

When the feeler arms 122 of the R adding mechanism are locked against movement as shown in Fig. 17 the feeler levers 90 are unhampered in their movements on account of the pin and slot connection and are enabled to affect the rocker arms 5 without affecting the feeler arms of the R adding mechanism. Conversely, if the feeler levers of the P adding mechanism are locked against movement, the feeler arms 122 of the R adding mechanism will be unhampered in their movements and enabled to affect the rocker arms 5. Thus it is seen that mutual interference of the feeler levers or arms is prevented.

As the movement of the control member U into its position U² has thrown the rocker frame 82, 83 with the stop bar 92, that previously locked the lever of the P adding mechanism, to the right, and thus released the feeler levers, it is necessary, as in the case of the mode of operation VI, to make the second stop bar 134a effective to lock the feeler levers 90. To this end a second cam 113b is provided on the arresting disk 113 of the control member Z. When the control member Z is thrown into its position Z⁴ this cam 113b throws the double arm lever 126 towards the right and thus actuates the gear as has already been described in the mode of operation VI, i. e. the gear 126, 126a, 127, 128, 129, 132, 133. By this means the stop bar 134a is caused to lock all the feeler levers 90, even though the stop bar 93 is moved out of engagement with said feeler levers.

The mode of operation VII under consideration can also be used for another purpose: In the mode of operation IV the individual sub-totals marked by the distinguishing mark L, appear upon the record strip and continually add on to each other in the R adding mechanism. Consequently the general or entire total of the sub-totals can be printed on the record strip by throwing the control members into their positions $U^2/Z^4$ in which they set the combination devices to effect the mode of operation VII of the machine. Beneath the last sub-total 814 68 given in the diagram IV and marked by the distinguishing mark $I$ the general total 2 824 01 seen in the R adding mechanism would therefore now be printed on the record strip together with the corresponding distinguishing mark, if the control members are thrown into their positions $U^2/Z^4$ and the main driving shaft is revolved. At the same time the record strip would be cut.

*Printing of sub-totals from the R adding mechanism and transference of the R adding mechanism total to the P adding mechanism.—Mode of operation VIII*

A diagram of this mode of operation is given in the table. In accounting or bookkeeping operations it often happens that after a number of different items and sub-totals have been added together, an intermediate calculating operation, i. e. the addition of a number of individual items, has to be performed separately and the total thus obtained has to be added to the other items. This is clearly set forth in diagram VIII. On the record strip the first two groups of items correspond exactly to those obtained in the modes of operation I and III. The individual items were exactly the same as obtained in the said operations. The final total 2 824 01 represents the total of all the items obtained in the item entering operation of the P adding mechanism and the sub-totalizing operations. After the said final total there follows on the record strip a group of individual items obtained in the item entering operation of the R adding mechanism, i. e. in the mode of operation VI, these items all being marked by the distinguishing mark $I$. The problem now to be dealt with is to print on the record strip the total 9 405 92 of these intermediate items, which appears in accordance with the mode of operation VI in the R adding mechanism, and to transfer said total to the P adding mechanism so that the sub-total 9 405 92 adds on to the sub-total 2 824 01 previously set up in the P adding mechanism. Therefore in the P adding mechanism the general total 2 824 01
9 405 92
———
12 229 93 will appear.

To accomplish this mode of operation, i. e. to print the sub-total 9 405 92 on the record strip and to simultaneously transfer it to the P adding mechanism the control members are thrown into the positions $U^0/Z^4$. In the position $U^0$ of the control member U the rocker frame is swung to the left and the intermediate wheels 73 are in engagement with the P adding mechanism. In the position $Z^4$ of the control member Z the feeler arms 122 of the R adding mechanism are released as described in the mode of operation VII, so that the feeler arms are enabled to transfer the total in the R adding mechanism in the rocker arm 5. Consequently, if the main driving shaft is now revolved, the type carriers 15 will be set accordingly so as to print the sub-total 9 405 92 that appears in the R adding mechanism on the record strip, and to simultaneously transfer the sub-total to the P adding mechanism, so that it adds on to the sub-total already stored in the latter adding mechanism. This said transference of the sub-total from the R adding mechanism to the P adding mechanism takes place because the intermediate toothed wheels 73 are in mesh with the toothed sector levers 34 and also with the P adding mechanism. In this manner the general total 12 229 93 is made to appear in the P adding mechanism.

A single-line spacing of the record strip is effected in this mode of operation. No printing of distinguishing marks, and no cutting of the record strip nor zeroizing of the P adding mechanism takes place. The control member Z is automatically thrown back from its position $Z^4$ to its normal position $Z^0$, while the control member U is already in its initial position $U^0$.

If it is desired to record further transactions on the strip it is only necessary to turn the main driving shaft without any setting of the keyboard, in order to shift on the record strip by the desired number of lines. Hereupon an item entering operation of the P adding mechanism (mode of operation I) or an item entering operation of the R adding mechanism (mode of operation VI) can be resumed. If the calculation is now to be terminated, the control members can be thrown into position $U^2/Z^1$ to set the combination devices for the mode of operation V, whereby the general total from the P adding mechanism is printed on the record strip and the strip is cut, while the P adding mechanism is zeroized.

In the preceding paragraphs it has been shown how the machine can be set for all its different modes of operation I to VIII by throwing the control members U and Z into different cooperative positions. Certain combination devices and gear which are necessary for the operation of the machine will now be more fully described.

*The keyboard with its key locking and number repeating devices*

The keyboard with its key locking and number repeating devices is illustrated in Figs. 23 to 25. As already mentioned, there are nine keys $t^1$ to $t^9$ for each digit or denomination. The stems 1 of the keys are guided in the cover plate 4 and the bottom plate 4 of the key casing. To obviate the simultaneous depression of two keys of the same digit, each row of keys is provided with a series of rolls or disks 201 disposed behind each other and of such size as to permit of a slight amount of play. The stem 1 of each key carries a cross-pin 202 which is forced between two neighbouring disks 201 when the key is depressed. The total amount of play between all the disks taken together is such that only one cross-pin of a key can pass through between neighbouring disks. By this means a simultaneous depression of two keys is prevented.

To maintain keys in their depressed positions the following arrangement is provided: Each key is normally pressed upward by a spring 203 coiled around the key stem and located between the bottom plate 3 and the cross pin 202. Associated with the keys of each digit is a locking plate 204 provided with nine perforations 205. These perforations, into which the cross-pins 202 extend, have a top horizontal section 206, a bottom horizontal section 207, and a vertical section provided with a slanting edge 208. When a key is depressed, as illustrated for example in the case of key $t^5$ in Fig. 24, the cross-pin 202 contacts with the slanting edge 208 and thereby shifts the locking plate 204 towards the left against the action of the spring 209 attached to the right end of the plate. When the key has been depressed into its lowermost position, so that the cross-pin 202 is located in the bottom section 207 of the perforation, the locking plate is pulled back towards the right by the spring 209 so as to lock the key in its depressed position. All the locking plates, whose number is equal to the number of digits, are pulled by their springs 209 into a position into which the lugs 210 at their left ends abut upon a common shifting bar 211, which acts as a locking, holding and releasing bar as will be presently described.

The keys depressed as described above depress the rocker arm 5 by which the setting members 14, 15 are stopped in positions corresponding to the depressed keys and their motions are transferred to the adding mechanisms when the main driving shaft 8 is turned. (Fig. 4.) In the novel machine safe-guarding means is provided to prevent the transference of wrong numbers to the adding mechanisms. Incorrect transferences of this kind arise in many adding machines through one or more keys being kept by the hand of the user of the machine in depressed or partially depressed positions. To avoid this, a peculiar shape is given to the perforations 205 in the present machine. The lower parts 207 of these perforations are rounded at their bottom edge and curve-shaped. When the revolution of the main driving shaft 8 begins, a mechanism that will be presently described shifts all the slidable plates or key-locking members 204 towards the right into the position shown in Fig. 25. By this operation the locking pin 202 of each depressed key is made to enter the narrow end of the horizontal section 207 of the perforation and is held in this position during the particular operation of the machine. Even if the key is held by hand, the curved edge of the section 207 of the perforations forces the cross-pin, and consequently also the key, into the particular position prescribed for the numeral in question and prevents it from assuming any higher or lower position when the machine mechanism is operated. Also the cross-pins 202 of the keys which are not depressed are caused to enter the ends of the sections 206 of the perforations as shown in Fig. 25, so that these keys are also locked and thus prevented from being depressed during the operation of the machine.

To shift the key-locking plates 204 into the aforedescribed key-locking positions during the operation of the machine, the following arrangement or gear is provided: The cam disk 24 fixed on the main driving shaft 8 has a cam groove 24a (Fig. 24) into which extends the roll 25a of the double arm lever 25. When the main driving shaft is revolved the arm 25 is deflected, this deflection being transferred to the bell crank lever 29 so as to cause its upper end, that carries the shaft 212, to swing to the right against the key-locking plate 204. Consequently the locking bar 211 fixed on the shaft 212 presses against all the locking plates 204, causing them to slide towards the right into their key-locking positions. (Fig. 25.) During the further rotation of the main driving shaft the aforedescribed setting of the type carriers and the transference of their movements to the adding mechanisms is effected. When this has been done the locking bar 211 is moved back into its position shown in Fig. 24, by means of the cam groove 24a and the aforedescribed motion-transferring gear, so that the bar 211 pulls all the locking plates towards the left into their normal positions by means of the lugs 210.

To cause the depressed keys, as for example the key $t^{25}$ (Fig. 24) to be moved upwards into their normal positions, the locking plates 204 have to be shifted to the left, a slight distance beyond their initial positions. To this end a cam 213, fixed on the main shaft 8 and shown in Fig. 24 in its normal position, contacts with a lever plate 214 during the latter part of the revolution of the main driving shaft. The lever plate 214 is pivoted on the shaft 26 and is provided at its bottom end with an angular perforation 215, 216, whose lower section 216 engages with the pin 217 of the connecting bar 218, when the parts are in the position shown in Fig. 24. The deflection of the lever plate 214 is therefore transmitted by the pin 217 and the connecting bar 218 to the rocker plate 219 pivoted on the shaft 27. The rocker plate 219 is connected by a bar 220 to the arm 221, that is fixed on the same shaft 212 as the locking bar 211. The gear just described is clearly illustrated in Figs. 5 and 6. The deflection of the rocker plate 219 is transmitted by this gear, and particularly by the bar 220, to the locking bar 211, causing the latter to press all the locking plates 204 towards the left into the position by broken lines shown in Fig. 24. The locking bar 211 thus also acts as a releasing member to deprive the locking pins 202 of the depressed keys of their locking supports, so that the keys are pressed upwards into their normal position by the pressure of their spring 203. As soon as the cam 213 of the main driving shaft slides off the lever plate 214, the entire gear or mechanism is returned in its initial position by the pull exerted by the spring 222. This spring is connected to the lever plate 214 and pulls it towards the left, so that the rocker plate 219 is pressed into its initial position against the immovable stop pin 223 by means of the pin and the connecting bar 218. By this movement of the rocker plate 219, the locking and releasing bar 211 is caused to return to its initial position, whereby the locking plates 214 are caused to assume their normal positions illustrated by solid lines in Fig. 24.

By means of the switch lever or key B, numbers set up on the keyboard can be caused to repeatedly affect the setting members and adding mechanism. By throwing the repeating switch from its initial position $B^0$ into the position $B^1$ shown in Fig. 25 the depressed keys must, therefore, be prevented from returning to their initial positions at the termination of a machine operation and must be held locked in their depressed positions. To this end the following mechanism is provided: Connected by means of the pivot 225 to the arresting disk 224, which is fixed to the repeating switch B, is a bent link 226 whose bottom end is pivotally attached to the connecting bar 218. Therefore, when the repeating switch B is turned into its position $B^1$, the pivot 225 is moved upwards and the connecting bar 218 is raised into the position shown in Fig. 25. In this position the motion-transferring pin 217 of the connecting bar 218 registers with the upper horizontal section 215 of the perforation in the lever plate 214. Consequently, when the main driving shaft 8 is turned and the cam 213 wipes against the lever plate 214, this latter is deflected, but this deflection does not result in a movement of the connecting bar 218, so that the locking bar 211 is not turned. The gear 219, 220, 221 remains unmoved and the depressed keys remain locked in the position shown in Fig. 24. By this means repeating operations are accomplished, i. e., a number set on the keyboard can be transferred to the adding mechanism as often as desired without renewed settings of the depressible keys.

To terminate the repeating operations by the throwing back of the repeating switch into its initial position, the following devices are provided: Fixed to the arresting disk 224 of the repeating switch is a striking member 227. When the repeating switch is thrown as previously described into its position $B^1$, the nose 229 of the dog 228, acted upon by the spring 230, seizes the striking member 227 as shown in Fig. 25. When the repeating switch is subsequently thrown back, after the termination of the repeating operations, into its initial position, the dog 228 pulls the rocker plate 219 towards the right, and by this means the members 220, 221 are caused to swing the locking bar 211, whose shaft 212 at this time is in the position shown in Fig. 24, towards the left, whereby the key-locking plates 204 are caused to release the depressed keys. The repeating operation or operations are thus terminated. In order to cause the locking bar to fly back into its initial position, a projection 231 of the bent link 226 presses the dog 228 downwards during the latter part of the return motion of the repeating switch, so that the dog 228 slips off the striking member 227. Consequently the rocker plate 219 can be pulled by the spring 222 back into its initial position, as already described, in which it bears against the stop pin 223.

It is thus seen that when the repeating switch is thrown back into its initial position, the numbers set up on the keyboard are automatically wiped out. It is possible, however, that the user of the machine might inadvertantly leave the repeating switch in its position $B^1$. If the switch U is thereupon shifted into a different position, for instance $U^1$, for the purpose of setting the machine for a different mode of operation, as for totalizing for example, in which operation the feeler levers dip into the radial slots of the numeral wheels to cause the setting of the type carriers, the keys held in their depressed positions by the repeating lever would interfere with the functions of the feeler levers. To obviate this danger provision is made for releasing the depressed keys when the switch U is thrown into its position $U^1$. As will be seen from Figs. 24 and 25, when the switch U is thrown into its position $U^1$ the curved arm 85 turns the shaft 86 as hereinbefore described, and by this means the arm switch carries the roller 89 is deflected, the roll which normally rests in a recess 98$a$ of the lever 98 passing into the neighbouring recess 98$b$ of the lever 98, that is pivoted by the pivot 235 in the cheek or side wall of the machine. In passing from the one recess to the other, the said roll 98a depresses the switch-holding lever 98 and this motion of the latter is transferred to the connecting bar 232 to the bell crank lever 233, whose lower end contacts with a striking pin 234 of the bell crank lever 236, 237. The latter lever is journalled on the shaft 26 and has a slot 238 at the bottom end of its arm 237 that embraces the pin 217 of the connecting bar 218. The deflection of the bell crank lever 236, 237 results in the bar 218 being pulled towards the right so as to deflect the lever plate 219 whose movement is transferred through the members 220, 221 to the bar 211, causing the latter to pull back the locking plates 204 to release the depressed keys, so that these spring up into their normal positions and the printing of the total is not interfered with by the keys, even though the repeating lever B¹ is in a wrong position. As soon as the roll 89 enters the recess 98b, the two springs 239 and 222 return the gear to its initial position.

This automatic restoring of the keys, or wiping out of the key registrations, when the repeating lever is in a wrong position does not, of course, preclude the mode of operation VI, in which a continual working of the R adding mechanism takes place, and the possibility of repeatedly transferring identical numbers into the R adding mechanism as in the case of the P adding mechanism previously described. To accomplish this it is only necessary to throw these switches U and Z into the positions U¹ and Z² for effecting the mode of operation VI and to subsequently throw the repeating lever from its initial position into its position B¹ after the desired numbers have been set up on the keyboard. By this means the repeated transference into the P adding mechanism of the number set up on the keyboard in accordance with the mode of operation VI is brought about as previously described.

*The crank handle*

The main driving shaft is turned at each operation of the machine through 360° by means of a crank handle provided with the special devices shown in Figs. 2a, 2b, 2c, 26, 26a and 26b. The crank 240, provided with a handle 241, has a hollow hub 240a which is arranged to rotate on the stub shaft or crank pivot 245 fixed in a wall 244 of the machine. At each machine operation the crank is only turned through an angle of 120°, this movement being sufficient to turn the main driving shaft 8 by 360°. To accomplish this, a ring 246 with internal teeth is arranged to revolve inside the crank hub 240a. The ring has three peripheral teeth 247 displaced relatively to each other by 120°. When the crank is turned counter clockwise as indicated by the arrow in Fig. 2a a spring pressed pawl 242 carries the ring 246 around with it by means of one of the teeth 247. The rotation of the ring 246 is transmitted by means of a pinion 248 pivoted on the wall of the machine to a toothed wheel 249 of equal size which is fixed on the main driving shaft 8. The ratio of transmission is such that when the crank handle is turned through 120° the main driving shaft 8 is turned exactly three times as much, i. e. through an angle of 360°.

Arranged on the stub shaft 245 is a helical spring 250 whose one end is fixed to the casing of the machine and whose outer end acts on the hub of the crank handle. When the crank is turned this spring is tensioned and after the crank has been turned through 120° the spring turns it to its initial position. The other end of the said spring is attached to a tensioning member in the form of a disk 251 that extends through the crank hub and can be turned in a crank hub and fixed in the same in various positions by means of a locking screw 252. By this means the tension of the helical spring can be regulated.

To prevent the crank from being turned back beyond its initial position, or forward by more than 120° and to obviate premature return motion of the crank during its forward movement, the following provision is made:

A ring 253 fixed in the crank hub is provided with internal ratchet teeth that engage with a pawl or locking member 254 pivotally attached to the wall 244 of the machine. The ratchet teeth extend in the interior of the crank hub from a stop 255 to a stop 256 fixed in the crank hub behind the rotatable toothed ring 246. Attached to the machine wall, as shown in Fig. 2a and Fig. 26, is an arcuate stop member 257. In the initial position of the crank member, shown in Fig. 2a, the latter is turned by the spring 250 into a position in which the stop 255 is pressed against the immovable stop member 257. At the same time the striking member 256 of the crank hub presses against the locking member or pawl 254, so as to force it into engagement with the ratchet teeth of the ring 253. When the crank is turned in the direction of the arrow, the pawl 254 wipes over the ratchet teeth of the ring 253 and prevents premature return motions of the crank, thus forcing the user of the machine to complete any rotary motion of the crank which has been started. When this forward motion of the crank is completed, the front slanting edge of the striking member 255, fixed to the crank hub, strikes against the pawl 254 and lifts it out of the ratchet teeth. Cooperating with the pawl 254 is a spring-pressed dog 258 provided with a catch that snaps over a locking edge on the pawl 254 and holds the latter out of engagement with the ratchet teeth when it has been lifted from the latter in the manner described.

The forward motion of the crank is limited by the cooperation of the front end 259 of the limiting member 256 with the rear end of the immovable stop member 257.

When the crank is released after it has been swung forward as described the spring 250 automatically swings it back into its initial position. As the pawl 242 pivotally attached to the crank hub wipes over the teeth 246 during its return motion, no transmission of the motion of the crank to the main driving shaft 8 takes place. As soon as the crank has returned to its initial position shown in Fig. 2a, in which the striking member 255 attached to the crank hub strikes against the immovable stop 257, the striking member 256 of the crank hub rotates the pawl 254 clockwise so that it is released by the catch 258 and it reengages with the internal ratchet teeth of the ring 253. At the same moment the pawl 242 drops into position behind one of the three teeth 247 in readiness for the next forward rotation of the crank.

*Automatic zeroizing of the P adding mechanism*

The automatic zeroizing of the P adding mechanism, which occurs in some modes of operation of the machine, is effected by means of the zeroizing shaft 136 placed to the left of the perpendicular through the shaft 76 of the P adding mechanism. The zeroizing shaft 136 is mounted to rotate in the rocker frame 82, 83. The manner in which the zeroizing shaft 136 is actuated in some modes of operation and caused to remain stationary in others will be described later. In the present section of the specification the manner in which the zeroizing shaft 136 acts on the P adding mechanism and returns the numeral wheels 74 into their zero position will be described.

A characteristic feature of the machine described herein is that all the functions occuring in each mode of operation are effected by a single revolution of the main driving shaft. For this reason there is a danger that, when the calculating mechanism is zeroized, inaccurate positions of the parts will arise, particularly when the machine is operated at exceptionally high speeds, because the zeroizing motion only commences during the latter part of the revolution of the main driving shaft. This circumstance involves extremely high peripheral speeds of the numeral wheels etc. which result in great tangential forces. As these tangential forces have to be destroyed at the last moment, the unavoidable play or lost motion between the movable parts is liable to lead to considerable inaccuracies of the positionings of these parts. On account of these circumstances it may happen that one or more of the numeral wheels jumps to a wrong number and thereby causes errors in the calculation.

In the present machine this contingency is avoided by a novel arrangement for returning the numeral wheel systems to their normal positions. This arrangement is such that the return of the numeral wheels to their exact zero positions is effected under all conditions, even if the machine is operated at an exceptionally high speed. To accomplish this, the shaft that effects the zeroizing operation is first turned beyond its zero position during the return motion of the adding mechanism, and thereupon positively rotated in a forward direction to the zero point. By thus turning the shaft back beyond the zero point and turning it back again to zero inaccuracies in the gear, which are unavoidable on account of the play between engaging movable parts and which are cumulative in the direction of their rotation, are eliminated to such an extent that an exact zeroizing is accomplished. On the other hand, by the positive rotation of the zeroizing shaft from the point beyond its zero point to its zero position frictional forces that oppose the kinetic energy of the movable parts are produced, whose magnitude is such as to completely balance the kinetic energy, so that the numeral wheels, held in their normal positions by springs, are turned by the latter precisely into their zero positions, so that no other form of stopping device for the same is necessary. This will become clear from a contemplation of Figs. 9, 10, 11 and 12. Fixed on the zeroizing shaft 136, which is journalled in the rocker frame 82, 83, is a toothed sector 137 that, when the shaft 136 is turned, meshes with the toothed wheel 138 fixed on the carrier shaft 76 of the P adding mechanism. This engagement of the toothed sector 137 with the wheel 138 only takes place, when the control member U is in the position $U^1$ shown in Fig. 3, i. e. when the rocker frame is swung to the right. But if the control member U is in its position $U^0$, that is to say, if the rocker frame is swung to the left, the zeroizing shaft 136 will be swung away from the carrier shaft 76 of the P adding mechanism and out of engagement with its toothed wheel 138. The said carrier shaft 76 has a groove or notch with which engages a pawl 142, journalled in a numeral wheel 74, due to the action of a spring 143. During the calculating operation the numeral wheel 74 is turned in the direction of the arrow shown in Fig. 11 and the pawl 142 wipes over the periphery of the shaft 75. During a zeroizing operation caused by the zeroizing shaft 136 the shaft 76 is also turned in the direction indicated by the arrows and carries the numeral wheels around with it by virtue of their pawls 142. Before and after the termination of this zeroizing motion the shaft 76 is held immovable by a holding member in the shape of a safe-guarding disk 140 provided with a crescent shaped recess that abuts upon the circular periphery of the disk 141, to which the toothed sector 137 is fixed as shown in Fig. 3. In order that the carrier shaft 76 with its safe-guarding disk 139 (Fig. 3) may also remain in the position shown when the rocker frame 82, 83 is swung to the left, i. e. when the zeroizing shaft 136 has been moved away from the shaft 76, a holding member, in the form of a projection 82e attached to the rocker frame, enters a recess in the safe-guarding disk 139 when the rocker frame is swung to the left. The recess into which the projection 82e enters is shown by broken lines in Fig. 3. The crescent shaped recess of the disk 140 is thus also maintained in the position shown in Fig. 3, when the rocker frame is moved to the left, so that when it is swung back towards the right, the disk 141 will again properly fit into the said recess.

In the aforedescribed zeroizing motion of the numeral wheel inaccurate positionings of the same during the last part of the zeroizing operation are prevented by the following means:

Fixed to the disk 141 (Figs. 11 and 12) of the zeroizing shaft 136 is a cam member 148 that cooperates with a cam 147 fixed to the disk 140. During the latter part of the zeroizing motion, before the last tooth of the toothed sector 137 disengages from the toothed wheel 138, the two cams 147 and 148 come into contact with each other and glide upon each other during the further rotation of the shaft 136 in such a way (Fig. 11) that the shaft 76 is turned back beyond its zero position to the extent of a certain angle α. Beside the cam 148 the disk 141 has a flat peripheral edge 141a with which engages the corner 140a at one end of the crescent shaped recess in the disk 140. As soon as the disk 140 has moved an amount beyond its zero position, further rotation of the zeroizing shaft 136 results in the disk 140 and the shaft 76 being turned back to their zero positions by the cooperation of the cams 147 and 148 and the members 141a and 140a. During this action the edge or projection 147a glides backwards on the cam 148. In Fig. 12 the parts are shown as they appear when they have been almost returned to their zero position and the latter position is shown in Fig. 9. In this latter position the crescent-shaped recess 140 fits closely against the circular periphery of the disk 141 and thereby holds the shaft 76 and the numeral wheels precisely in their zero positions.

It is thus seen that an important feature in this novel arrangement for avoiding inaccurate zeroizing consists in the fact that, during the latter part of the zeroizing motion, a positive turning of the parts beyond their zero position, and an equally fast turning back of a part to the correct zero position, is effected by the action of a suitably shaped cam, whereby the play which has to be provided between moving parts and the effect of the kinetic energy are prevented from giving rise to inaccuracies and an exact zeroizing of the parts is obtained.

The return of the numeral wheels 74 into their zero position can, of course, only be effected when the feeler members 90a of the feeler arms have been moved out of the radial slots 74f of the number wheels. To this end a cam 168ª (Fig. 8) is fixed on the main driving shaft 8 which engages with the roll 135, 135a of the swinging frame 134 during that period of the revolution of the main shaft 8 in which the automatic zeroizing operation is effected. The swinging frame, which as described above also acts as a rocking frame, pushes back the feeler levers 90 so as to remove their feeler members 90a from their aforesaid radial slots. In the particular modes of operation of the machine in which the feeler levers have been previously locked by the arresting bar 92 or the locking bar 134a, the motion of the cam has no effect.

To prevent over-travelling of the machine in cases in which the speed of revolution imparted to the main driving shaft is excessive, a centrifugal governor is provided in a special casing 181 as shown in Fig. 1. This governor consists chiefly of two centrifugal weights 182 and 183 which are pivotally connected to the ends of a two ended arm 185 fixed to the governor shaft 184. The governor shaft 184 is rotated from the main driving shaft 8 by means of toothed wheels 9, 186, 187, 188, 189 which greatly increase the speed. If this speed exceeds a certain limit, the centrifugal weights 182, 183 expand the springs, tending to pull them outward and causing their shoes 190 to enter into frictional engagement with the inner periphery of the governor casing. The greater the speed the greater is the friction thus produced, and by this means a certain speed is prevented from being exceeded. The last toothed driving wheel 189 carries the governor arm 185 around by means of a pawl and ratchet, so that when the main driving shaft is stopped suddenly, the centrifugal governor can speed down gradually under the action of the kinetic energy without reacting on the main driving shaft and thereby causing excessive strain.

*Zeroizing, coupling and uncoupling devices*

As shown in the table of the modes of operation of the machine, an automatic zeroizing of the P adding mechanism takes place in some of the modes of operation, but not in others. The manner in which this is accomplished will now be described.

In the mode of operation I the rocker frame 82, 83, in which the zeroizing shaft 136 is journalled, is rocked to the left, because the control member U is in the position $U^1$. Consequently, although the zeroizing shaft 136 is rotated from the main driving shaft, no engagement between the toothed sector 137 and the pinion 138 of the P calculating mechanism takes place, so that no zeroizing is effected.

In the mode of operation II, as also in the mode of operation III, the rocker frame is swung to the right, so that the toothed sector 137 would enter into engagement with the pinion 138. But, as will appear from the aforesaid table, an automatic zeroizing of the P adding mechanism must only take place in the mode of operation II, and not in the mode of operation III. This selective action is effected by the following gear:

On the same zeroizing shaft 136 in which the toothed sector 137 is fixed there is mounted a toothed wheel 146 (Figs. 8, 20, 20a), which is adapted to revolve on the shaft 136 and whose hub 149 has a recess 149a which is adapted to be seized by a coupling pawl 150, that is shown in Fig. 8 in engagement with said recess 149a, while in Fig. 20 it is shown out of engagement therewith. The coupling pawl is pivoted in a housing 152 fixed on the zeroizing shaft 136 and a leaf spring tends to throw the coupling pawl 150 into its coupling position. Consequently, when the wheel 146 is rotated by the main driving shaft 8 (Fig. 8) by means of the intermediate gear wheels 60, 105, 106 and 145, the zeroizing shaft 136 will or will not be rotated according as the coupling pawl 150 is in or out of engagement with the recess 149a. In order that the toothed wheel 146 with its hub 149 may always be in a position in which the coupling pawl 150 is enabled to engage with the recess 149a when the main driving shaft is in its normal or initial position, the toothed wheel 146 is held in the said proper position by a spring-pressed pawl 157, pivoted on the cheek or wall 83 of the rocker frame, by virtue of the wedge shaped nose of a pawl 157 that enters a notch of corresponding shape in the positioning disk 158' (Figs. 20 and 20a), fixed to the toothed wheel 146.

The alternate raising and lowering of the coupling pawl 150 from and into the recess 149a is effected by a bell crank uncoupling or clutch actuating lever 153, 154 adapted to swing on a pivot 155 fixed in the plate 83 of the rocker frame. Normally this uncoupling lever drops by its own weight into the position shown in Fig. 8, in which it does not affect the coupling pawl 150, so that the latter is pressed by the spring 151 into its coupling position. This position of the parts obtains in the mode of operation II, in which an automatic zeroizing of the P adding mechanism is effected.

It will now be assumed that the control member U is thrown into its position $U^2$ for effecting the mode of operation III of the machine, in which the intermediate wheels 73 are lifted into their position A (Fig. 8). The following gear will now be affected.

The carrier shaft 97 of the aforesaid intermediate wheel 72, in moving upwards, causes the double arm lever 160, 160a to swing round the shaft 77 of the R adding mechanism in the manner indicated in the Figs. 8 and 20. Pivotally connected to the bottom end of said lever is a triangular member 161 which, in the initial position of the gear (Fig. 8), bears with its rear edge against the head of the shaft 121.

Depending from this member 161, and turning loosely on a pivot 161a thereon, is a supporting bar 162, that is notched at its lower end. When the double arm lever 160, 160a is moved into the position shown in Fig. 20, the notch at the end of the supporting bar 162 rests upon a pin 163a, and this causes the triangular member 161 to be deflected towards the left so that its lower end strikes against the pin 154a on the lever 153, 154. Consequently, the longer end of this clutch actuating lever is swung upwards and its head 156 pushes the lower arm 150a of the coupling pawl inwards towards the shaft 126, whereby the coupling pawl is disengaged from the recess 159a, and the pinion 146 is uncoupled from the zeroizing shaft 136. In this manner the zeroizing shaft 136 is uncoupled in the mode of operation III of the machine, so that no zeroizing of the P adding mechanism takes place. The front rounded end 153a of the uncoupling or clutch actuating lever 153 enters an arcuate recess 152b of the housing 152 when the uncoupling operation just described takes place, and by this means secures the housing 152, the zeroizing shaft 136, and the coupling pawl 150 against rotation.

In the mode of operation IV of the machine in which, as set forth in the aforesaid table, an automatic zeroizing takes place, the control member U is in the position $U^1$, i. e. in the same position as in the mode of operation II. Consequently the uncoupling lever 153, 154 assumes the position shown in Fig. 8, and an automatic zeroizing of the P adding mechanism takes place, because the throwing of the control member Z into position $Z^3$ has no effect on the clutch actuating lever 153.

In the mode of operation V the control member U is in position $U^2$, i. e. the supporting shaft 97 of the intermediate wheels 73 is swung upwards and the double arms 160, 160a is deflected similarly as in the mode of operation III. To obviate the disengagement of the coupling pawl 150 which takes place in the mode of operation III, i. e. in order to effect the zeroizing of the P adding mechanism required for the mode of operation V, the following arrangement is made:

By the throwing of the control member Z into the position $Z^1$ that takes place in the mode of operation V, the teeth of the arresting disk 113 (Fig. 3), which turns with the control member Z, cause a toothed sector 167a to turn round the shaft 121. The lower arm 167 integral with the toothed sector has a pin that cooperates with the slotted end or fork of a lever 166 fixed on a shaft 164, so that the latter is caused to execute a partial revolution. Another forked lever 165 (Fig. 20) fixed on the shaft 164 deflects a lever 163 that carries the pin 163a which serves to support the supporting bar 162. By the deflection of the lever 163, which is effected in the direction of the arrow (Fig. 20), the supporting bar is consequently deprived of its support. Consequently, even though the lever 160, 160a is deflected, the triangular member 161 does not strike against the pin 154a of the clutch actuating lever 153, but hangs loosely without affecting that lever, so that this latter is kept by its own weight in the position shown in Fig. 8, and the coupling pawl 150 remains in its coupling position to effect the automatic zeroizing of the P adding mechanism.

As shown in the aforementioned table, to set the machine for effecting the mode of operation VI, the control member U is thrown into its position $U^1$. In this latter, contrary to the mode of operation II, no zeroizing of the P adding mechanism takes place and therefore the coupling pawl 150 is raised to its uncoupling position. This is effected by the following arrangements:

When the control member Z is thrown into the position $Z^2$ to obtain the mode of operation VI, the gear shown in Figs. 3 and 30 already described, viz. the toothed arresting disk 113, the toothed sector 167a and the forked lever 166, impart a partial revolution to the shaft 164, but through a greater angle than in the mode of operation V. Consequently, the lever 163 is also turned through a greater angle, and a pivoted spring member 163e, which is pulled by its spring against the stop 163f, is caused to contact with the pin 154a of the clutch actuating lever 153. In this manner the latter is lifted into the position shown in Fig. 20 and by this means the uncoupling of the zeroizing shaft 136 is brought about.

In the mode of operation VII, the control member U is thrown into the position $U^2$, so that the zeroizing shaft 136 is uncoupled as shown in Fig. 20 and no zeroizing of the P adding mechanism takes place, for the control member Z, when thrown into its position $Z^4$, has no effect on the clutch actuating mechanism.

Finally in the mode of operation VIII, the control member U is in its initial position $U^0$, so that the zeroizing shaft 136 is swung to the left as in the mode of operation I and no zeroizing of the P adding mechanism can take place, because the teeth 137 cannot enter into engagement with the teeth 138 of the carrier shaft 76 of the P adding mechanism.

The zeroizing, coupling and uncoupling devices for all the modes of operation of the machine have now been described. A supplemental arrangement which is shown in Fig. 8 will now be described, which is a useful adjunct, but is not absolutely necessary for the operation of the zeroizing gear. As shown in Fig. 20, the back pressure exerted by the spring actuated coupling pawl 150 on the clutch actuating lever 153 produces a downward force on the end of lever 153 which is transmitted through the pin 154a, the triangular member and the double arm lever 160 to the carrier shaft 97 of the intermediate gear wheels. Since the proportional lengths on the lever arms 153 and 154 are as three is to one, the force exerted by the coupling pawl 150 is magnified three times in its transmission to the supporting shaft 97 which is itself being supported in raised position in this operation of the machine. To obviate this, a pin 153b is provided at the middle of the arm 153 of the clutch actuating lever, which pin is directly connected with the shaft 97, so as to take the aforementioned back pressure before it is transformed or stepped up as described. As shown in Fig. 8 a member 158 depends from the shaft 97 to whose lower end a stepped dog 159 is pivotally attached. The clutch actuating lever is supported by means of its pin 153 on this stepped dog, the pin 153b being guided in a slot 158a of the depending member 158. By means of this device the back pressure exerted by the coupling pawl, which tends to swing the clutch actuating lever 153 downwardly, is directly applied through the members 159 and 158 to the supported shaft 97.

This supplemental device must, however, be made inoperative when the clutch actuating lever has to drop downwards, to permit of the automatic zeroizing of the adding mechanism even though the shaft 97 is raised as in the mode of operation V. As described in the case of the mode of operation V of the machine, this was accomplished by depriving the depending supporting bar 162 of its support by moving the supporting pin 163a out of its path. In consequence of this, the clutch actuating lever 153 fell downwards by its own weight and allowed the coupling pawl 150 to effect the coupling operation. This latter would, however, be prevented by the aforesaid supplemental device, because it effects a rigid connection between the carrier shaft 97 and the clutch actuating lever 153. To destroy this rigid connection the following devices are provided:

By the deflection of the lever 163, and the downward movement of the supporting pin 163 caused thereby, a lever 168 is simultaneously turned downwards by a projection 163c of the lever 163 as shown in Fig. 8. The downwardly turned pressure lever 168 throws the lower end of the stepped pivoted dog 159 towards the left, so that its upper end swings towards the right away from the pin 153b of the clutch actuating lever 153. Consequently, the pin 153b can slip downwards freely in the slot 158a, and the lever 153 sinks by its own weight to release the coupling pawl 150. By this means the automatic zeroizing of the P adding mechanism is secured for the mode of operation V of the machine, even when the supplemental device is provided.

*Zeroizing of the R calculating mechanism by a manually operated key*

The R adding mechanism could be automatically zeroized like the P adding mechanism. To accomplish this the aforedescribed gear for the zeroizing motion, and for the automatic zeroizing, coupling and uncoupling devices would have also to be provided in the R adding mechanism or made to cooperate with the same. Instead of this, in the machine shown herein, an arrangement is provided by which the R adding mechanism is zeroized by a hand operated key. The key used for this purpose is shown in Fig. 14. It is introduced into a slot provided at one end of the carrier shaft 77 of the R adding mechanism, Figs. 10 and 13, and then turned counterclockwise, whereby the R adding mechanism can be moved into its zero position independently of the devices affected by the switches of the machine. Arranged within the numeral wheels 75 are pawls, similar to the pawls 142 in the numeral wheels 74 of the P adding mechanism, and these are adapted as in the latter mechanism to engage with a notch in the shaft 77, so that they carry the numeral wheels round into their zero positions when the key is turned counter-clockwise.

As allowance has to be made for play between movable and interengaging parts of the R adding mechanism as in the P adding mechanism, a means for safe-guarding the accurate zeroizing of the former is provided. The safe-guarding arrangement is shown in Fig. 13. Fixed on the carrier shaft 77 is a crescent shaped cam 171 whose peripheral edge that lies nearest to the shaft 77 is formed in a shape of a ratchet. Cooperating with this ratchet is a spring pawl 173 fixed on the shaft 172. When the shaft 77 of the R adding mechanism is turned counter-clockwise, the said ratchet and pawl prevent a premature turning back of the shaft 77 and thus prevent wrong settings of the R adding mechanism, which would be effected by premature clockwise rotations of the shaft, because the numeral wheels would then remain stationary. Hence when the restoring key is turned in the direction for zeroizing, this motion must be continued until it is completed, and means are provided for preventing the key from being withdrawn from the shaft prematurely. But even if the key is turned through 360° there is a danger, due to the play between interengaging parts, of the numeral wheels failing to reach their exact zero positions. Therefore, in order to compel the user of the key, to turn it a small distance beyond 360° the following arrangement is provided:

By the cam 171 the pawl 173 is gradually lifted when the carrier shaft 77 is turned. This motion of the pawl 173 is transmitted through the shaft 172, and the forked arm 174 fixed on the same, to the arm 176 so that the latter is swung from the position shown in Fig. 13 towards the left, that is, before the keyhole. By this means the withdrawal of the key is prevented. The pawl 173 cannot drop back when the key has been turned through 360°, because the cam 171 extends beyond this angle, so that the key has to be turned further counter-clockwise, because its removal from the keyhole is prevented by the member 176, until the shaft 77 has been turned a sufficient distance beyond 360° to enable the pawl to be swung down by a spring (not shown) towards the shaft 77. By this motion of the pawl 173 the blocking member 176 is turned clockwise away from the keyhole, to permit of the withdrawal of the key after it has turned the shaft 77 a sufficient distance beyond the 360° as described.

To prevent the machine from being operated during the using of the key, a locking member 178 is moved into a recess in a locking disk 179 during the rotation of the key by means of a cam 177 fixed on the carrier shaft 77. The locking disk 179 is fixed on a shaft 180 geared to the main driving shaft. By this means the machine is blocked during the operation of the zeroizing key, and the blocking remains operative until the R adding mechanism has been turned to its zero position.

Another mechanism required in the R adding mechanism consists in means for throwing out of operation the transfer members or pawls which serve to step round the next higher numeral wheel, when a numeral wheel has completed a revolution. A means of this kind is not required in the P adding mechanism, because the zeroizing of the same always takes place only when the rocker frame 82, 83 is swung towards the right and is therefore in the position shown in Fig. 9. In this position the said transfer members of the P adding mechanism, which are arranged on the carrier shaft 97 of the intermediate wheel, are always in inoperative positions out of the range of the P adding mechanism. Consequently, the zeroizing shaft 136 only acts on the P adding mechanism when the associated transfer members are inoperative.

This is not the case in the R adding mechanism. The associated digit transfer members are arranged on the shaft 172 to the right of the shaft 77. The said transfer members comprise striking pins 75g on the numeral wheels 75 (Fig. 9) that cooperate with projections 169a of dogs 169. These dogs 169 normally hold the transfer pawl 170 in inoperative positions, but when they are swung back by means of the striking pin 75g they release the pawls 170, enabling them to be pulled by springs into positions in which they cooperate with the ratchet wheel 75b of the numeral wheels. The manner in which the transfer pawls are operated to effect the transferring movements of the numeral wheels will not be gone into here, as it forms subject matter of a separate pending application. In any case the movement of the transfer pawls 170 into their operative positions during the zeroizing of the R adding mechanism by means of a manually operated key must be prevented. To this end the following arrangement is provided:

By the rotation of the carrier shaft 77 of the R adding mechanism by means of the key, as described in connection with Fig. 13, the shaft 172 is through a certain angle. By this means the supporting arms 174a fixed on the shaft 172 are deflected so as to engage with the lower edges of the transfer pawls 170 as shown in Fig. 9. Hence, even if the dogs 169 should have been deflected clockwise to release the transfer pawls 170, the latter will be held out of operative engagement with the numeral wheel of the R adding mechanism by the supporting arm 174a, so that the transfer pawls will remain ineffective. Consequently, the zeroizing of the R adding mechanism by means of the key will not be interfered with.

*Automatic restoring of the control members to their initial position*

In all modes of operation of the machine described herein, in which no continuous item entering operation of an adding mechanism takes place, the two control members U and Z are automatically restored to their initial positions, whereby the use of the machine is facilitated and simplified in a very high degree. This automatic restoration will now be described.

As regards the control member U, whose initial position is $U^0$, its restoration from its position $U^1$ to its initial position is effected in the following manner (Fig. 18):

By the movement of the control member U from its position $U^0$ to its position $U^1$, the curved arm 85 fixed to its pivot 84, is swung clockwise to effect operations already described in connection with Fig. 3. By the deflection of the arm 85 a link 108 connected to the extension 85d of the lever 85 is moved. This link 108 has an angular perforation 108a at its other end (see also Fig. 18b) which rests upon the pin 109a of the push lever 109, shown by dotted lines in Fig. 18, but by solid lines in Fig. 18b. The push lever 109 is adapted to swing round the pivot 109b fixed to a cheek or wall of the machine. Therefore, when the control member U is thrown into the position $U^1$, the link 108 swings the push lever 109 down into the position shown in Figs. 18 and 18b. A spring 110 assists in effecting this motion of the push lever 109, which is thus brought into the path of a cam 111 fixed on the shaft 104.

The shaft 104 is arranged to be driven by means of the toothed wheels 60, 105, 106 and 107 as shown in Fig. 8. Therefore when the control member U is thrown into its position $U^2$ to cause the machine to execute some of the modes of operation I–VIII, and the machine is thereupon caused to execute the operation for which it is set by the turning of the main driving shaft, the shaft 105 is rotated in the direction of the arrow indicated in Fig. 18 and the cam 111 contacts with the contacting surface 109c of the push lever 109 during the latter part of the revolution of the shaft 104, whereby the push lever 109 is swung upwards. Consequently the pin 109a and the link 108 are caused to throw the control member U from its position $U^1$ back into its initial position $U^0$.

This automatic restoration of the control member from its position $U^1$ is always effected, excepting in the case of the mode of operation VI, in which a continuous item entering operation of the R adding mechanism takes place. When a continuous item entering operation of the R adding mechanism takes place, the switch must not be restored to its initial position, because this would result in the continuous item entering operation of the adding mechanism being stopped. The manner in which the restoration of the control member U is prevented in the mode of operation VI will be described below. In the mode of operation I, in which a continuous item entering operation of the P adding mechanism takes place, the control members U and Z occupy their initial positions $U^0$ and $Z^0$ at the outset.

It will now be explained how the control member U is automatically returned to its initial position from position $U^2$. When the control member U reaches its position $U^1$ and is then moved further into the position $U^2$, the pin or pivot which connects the extension 85e of the curved arm 85 to the link 108 describes an arc in which no further appreciable movement of the pin 109a of the push lever 109 is effected. Consequently, the latter remains in the position shown in Fig. 18. At the same time, when the lever U reaches its position $U^1$, the pin 85c enters the slot in the arm 94a of the bell crank lever 94, so that when the control member U is thrown over further to the position $U^2$ the end 94 of said crank lever is raised as described in connection with Fig. 3. The upward motion of the raising bar 95 (Fig. 3) is utilized by means of the pin 95b for the purpose of turning a double-armed lever 102, so that the pin 102b at its other end enters the cam groove 103a of the cam disk 103 fixed on the shaft 104. Consequently, when the main driving shaft is revolved and the shaft 104 is rotated thereby in the direction of the arrow shown in Fig. 18, the cam groove 103a throws the pin 102b out of the cam disk 103 during the latter part of its revolution, and the control member U is thus positively thrown back from its position $U^2$ into the position $U^1$ shown in Fig. 18 by means of the gear 102, 95 and 94. As soon as the control member reaches its position $U^1$, the cam 111 fixed on the shaft 104 becomes effective as previously described and throws the control member U from position $U^1$ into its initial position by means of the gear 109 and 108.

The automatic restoration of the control member Z will now be described. This control member is shown in its initial position $Z^0$ in Fig. 18. When it is thrown into its position $Z^1$, the pin 113a on the arresting disk 113 of the control member moves the guide member 191, whose slots slide up and down on the two shafts 77 and 121, downwards. By this means the roll 191a at the bottom end of the guide member 191 is depressed to the level of the dash and dot line $z^1$, i. e. into the path of the cam curve 125b and the cam disk fixed to the shaft 104. When the main driving shaft is revolved the slanting section of the cam curve 125b throws the roll 191a from its position $Z^1$ upwards so that the guide member 191 throws the control member $Z^1$ back into its initial position $Z^0$.

The events that take place when the control member Z is thrown into its position $Z^2$ will now be described.

As will be seen from the above table, this only takes place in one of the modes of operation, viz. in the mode of operation VI. As this consists in a continuous item entering operation of the R adding mechanism, no automatic restoring of the control members must take place when the two control members are in their positions $U^1$ to $Z^2$. This is accomplished in the following manner: In Fig. 18 the control member U occupies the position $U^1$, and the control member Z the position $Z^0$. In the arresting disk 113 of the control member Z there is a cam groove 113e (shown by broken lines) into which extends the pin 192u of a double-armed lever 192 (Figs. 18 and 18a). The said lever 192 is pivoted by a pivot 192b in a wall of the machine. When the control member Z is moved into its position $Z^2$, as shown in Fig. 18a, the double-armed lever 192 is deflected by the cam groove, so that the roll at its bottom end is moved away from a projection extending upwardly from the link 108. Consequently, the latter is moved upwards by a spring 114 thus causing the pin 109a (see Fig. 18b) to move to the section 108a of the angular slot in the link 108. Furthermore the control member Z, when moved into its position $Z^2$, shifts the guide member 191, by means of the pin 113a, downwardly into a position in which the roll 191a assumes the level $z^2$ (Fig. 18) at which it is in the path of the cam curve 125c of the cam disk 125.

When the shaft 104 is now rotated in the direction of the arrow by a revolution of the main driving shaft, the cam 111 lifts the push lever 109 but the pin 109a of the latter cannot affect the link 108, because it rises in the vertical section of the angular perforation without moving the link 108. Consequently the control member U remains in its position $U^1$. Furthermore the roll 191a is not affected by the cam curve 125c of the cam disk, because the said curve is perfectly circular so that the control member Z remains in its position $Z^2$. It is thus seen that when the control members are thrown to set the combination devices for affecting the mode of operation VI, i. e. the continuous item entering operation of the R adding mechanism, no automatic restoration of the control members to their initial positions takes place.

When the control member Z is in its position $Z^3$, the pin 113a of the arresting disk 113 depresses the guide member 191 to such an extent that the roll 191a sinks to the level $z^3$. In this position the roll is in the path of the cam curve 125d, which is provided near its termination with a deflecting member 125f, that is generally held by a spring in the position shown in Fig. 18. When the main driving shaft is now revolved to rotate the shaft 104 the roll 191a will ultimately reach the deflecting member 125f, and this latter will be swung round so as to act as a path for the roll across the cam curve 125c. The roll 191a is thus diverted from the cam curve 125d across the cam curve 125c and out of the cam disk through the path 125h, and hereby the guide member 191 is pressed upwards to throw the control member Z into its initial position $Z^0$. When the roll 191a has been diverted from the cam curve as described, the deflecting member 125f is rotated by its spring into its normal position shown in Fig. 18.

Finally, the restoration of the control member Z from its position $Z^4$ must be described. The cam disk 125, which has already been described in connection with Fig. 18 has a cam groove 125a (Fig. 17) in its rear side. When the control member Z is thrown into position $Z^4$, i. e. towards the left in Figs. 17 and 18, the pin 113a on the arresting disk moves in the section 191b of the slot in the guide member 191 without affecting the latter in any way. The pin 113a does act, however, on the hooked draught member 117 to deflect the curved lever 118 pivoted on the pivot 119, so that the roll at the bottom end of the lever 118 enters the cam groove 125a of the cam disk 125 and moves inwards to the circular section of this cam groove. When the main driving shaft is then revolved and rotates the cam disk 125, the curved lever 118 is thrown out of the cam disk 125 again by the cam groove 125a, and the hooked draught rod 117 is thus caused to pull the control member from its position $Z^4$ back to its initial position.

All the positions of the control members, and the manner in which they are automatically restored to their normal positions, have now been described. As already mentioned they are restored from all positions, excepting those in which they are set for effecting the mode of operation VI, in which their automatic restoration is prevented, because the R adding mechanism has to work in this mode of operation continually.

Blocking device

From the preceding description of the various modes of operation of the machine, it is seen that only the two modes of operation I and II are required when the machine is used as a cash register. It is therefore important to block the machine for all the other modes of operation so that the employee who uses the machine as a cash register during the hours of selling is not able to carry out any manipulations except the ones prescribed. To this end the following blocking device is provided: In the wall of the machine which is situated at the rear in Fig. 3 there is a keyhole 200, a front elevation of which is shown in Fig. 3a. Fig. 3a is therefore a rear view of a part of Fig. 3. Arranged behind this keyhole is a blocking member S which is pivoted on the wall of the machine by a pivot $S^7$. The blocking member S has an arcuate portion $S^8$ at the top which cooperates with a correspondingly shaped recess 118d in the arresting disk 113 fixed to the switch Z. In Figs. 3 and 3a the blocking device is shown in its inoperative position. It is also shown in Figs. 18 and 18a in a similar elevation to that represented in Fig. 3. Fig. 18 shows it in its operative position and Fig. 18a in its inoperative position. Connected to the locking member S is a moving member $S^6$ (Fig. 3a).

When a suitable key is inserted in the keyhole 200 and turned clockwise its bit engages with the horizontal arm $S^4$ of an angular tumbler $S^4$ $S^9$ which by means of a spring is kept in engagement with a notch or arresting recess $S^{10}$ of the blocking member S. The pressure of the key bit disengages the tumbler from the notch of the blocking member so that the latter is enabled to rotate. During the further motion of the key, its bit enters between the two cams or projections shown on the member $S^6$, and thus turns the blocking member S towards the left, causing it to enter the curved recess in the arresting disk 113 as shown in the blocking position Fig. 18. When the key is now turned further around and withdrawn from the keyhole, the tumbler $S^9$ drops back into a recess $S^5$ and keeps the blocking member S in its blocking position. The described blocking operation can only be carried out after the control member Z has been previously moved into its initial position $Z^0$. If it is in another position as shown in Fig. 18a the arcuate portion $S^8$ of the blocking member strikes against the periphery of the arresting disk 113 and this prevents the turning of the key, so that the blocking operation cannot be effected.

When the blocking member S is turned into the locking position by the key as described, a connecting bar or stop bar 112 connected to an arm $S^2$, fixed on the shaft or pivot of the blocking member S, is moved so that the upper end of the bar 112 turns a flap 107 arranged before the observation opening of the R adding mechanism. (See Fig. 8.) In this manner the observation opening is closed, so that only the possessor of the key is enabled to read the results in the R adding mechanism.

Only the positions $U^0$ and $U^1$ of the control member U belong to the pure cash register functions of the machine. For this reason a device is associated with the described blocking arrangement which prevents the control member U from being thrown into the position $U^2$. This device is shown in Figs. 18 and 18a. When the blocking member S reaches its blocking position shown in Fig. 18 the pin $S^3$ on the same cooperates with an arresting nose 103c of the link 108. In this position of the parts the control member U can be moved from $U^0$ to $U^1$, but not further to $U^2$ as this is prevented by the pin $S^3$. But when the blocking member is in its inoperative position shown in Fig. 18a, its pin $S^3$ is out of the path of the arresting nose 108c so that the link 108 is free to move and the control member U can be moved into all of its positions.

From the above description it will be seen that the two multi-position control members U and Z are arranged to set the combination devices for all the different modes of operation of the machine.

All the essential functions of the entire machine have now been described. As already mentioned above, the machine is also provided with a gear for shifting the record strip to different extents, a gear for effecting or preventing the cutting of the strip, and an arrangement for printing the distinguishing marks belonging to the various modes of operation. These gears form subject matter of a copending patent application.

In conclusion the carrier of the record strip or bobbin shown in Fig. 1a will be described:

This bobbin is arranged so that a new record strip can be slipped on conveniently at all times. The bobbin consists of two circular side walls 301 and 302 which are fixed to two hubs 301a and 302a. The sleeve 303 is connected by a screw pin 304 with the right hand side wall 302 only of Fig. 1a. Consequently, for the purpose of slipping on a new record strip only the other side wall 301 can be pulled off the shaft 305 on which the bobbin is journalled.

I claim:—

1. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, and means for transferring totals from each one of the sets of totalizers to the other set.

2. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, means for transferring totals from each one of the sets of totalizers to the other set, and means for moving the drive wheels into and out of engagement with said actuating means.

3. In a machine of the class described, the combination of two sets of totalizers, a common set of drive wheels for actuating said sets of totalizers and disposed substantially intermediate thereof, key controlled means for actuating said drive wheels, a printing mechanism actuated by the aforesaid actuating means and means associated with one of said sets of totalizers for controlling said actuating means, means for moving the set of drive wheels into engagement with either of the sets of totalizers, and means for moving the drive wheels out of engagement with the aforesaid actuating means, whereby the printing mechanism may be actuated without an actuation of the drive wheels.

4. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, and means for optionally transferring the totals of each of said sets of totalizers to the other.

5. In a machine of the class described, the combination of two sets of totalizers, a common set of drive wheels for actuating said sets of totalizers and disposed substantially intermediate thereof, key controlled means for actuating said drive wheels, means for transferring a total from one of the sets of the totalizers to the other set, and means for zeroizing the set of totalizers from which the total has been transferred, said zeroizing means being controlled by the aforesaid actuating means.

6. In a machine of the class described, the combination of two sets of totalizers, a common set of drive wheels for actuating said sets of totalizers and disposed substantially intermediate thereof, key controlled means for actuating said drive wheels, means for transferring a total from one of the sets of the totalizers to the other set, and means associated with the aforesaid key controlled means for zeroizing the set of totalizers from which the total is transferred.

7. In a machine of the class described, the combination of two sets of totalizers, a common set of drive wheels for actuating said sets of totalizers and disposed substantially intermediate thereof, key controlled means for actuating said drive wheels, a printing mechanism actuated by the aforesaid actuating means and means associated with one of said sets of totalizers for controlling said actuating means, means for moving the set of drive wheels into engagement with either of the sets of totalizers, means for moving the drive wheels out of engagement with the aforesaid actuating means, and means for zeroizing the set of totalizers with which the control means for said actuating means is associated.

8. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, and individual means associated with each of said sets of totalizers for controlling the aforesaid key control means, whereby totals may be transferred from each one of the sets of totalizers to the other set.

9. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, means for moving the drive wheels out of engagement with said actuating means, and means associated with one of the sets of totalizers for controlling said actuating means.

10. In a machine of the class described, the combination of two sets of totalizers, a common set of drive wheels for actuating said sets of totalizers and disposed substantially intermediate thereof, key controlled means for actuating said drive wheels, means for moving the set of drive wheels into engagement with either of the sets of totalizers, and individual means associated with each of the said sets of totalizers for optionally controlling said actuating means when the drive wheels are in engagement with the other set of totalizers.

11. In a machine of the class described, the combination of two sets of totalizers, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, and means for transferring totals from each one of the sets of totalizers to the other set.

12. In a machine of the class described, the combination of two sets of totalizers, the numeral wheels of each set of totalizers having depressions therein, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, sets of feeler levers each associated with a set of totalizers and adapted to engage the depressions of the numeral wheels of its associated set of totalizers, means for transferring the total engaged by either of the sets of feeler levers to the other of said sets of totalizers, and control means for each set of feeler levers for optionally permitting them to operate.

13. In a machine of the class described, the combination of two sets of totalizers, the numeral wheels of each set of totalizers having depressions therein, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, two sets of feeler levers each associated with a set of totalizers and adapted to engage the depressions of the numeral wheels of its associated set of totalizers, means for transferring the total engaged by either of the sets of feeler levers to the other of said sets of totalizers, an arresting means mounted within said pivoted frame for holding one of said sets of feeler levers out of engagement with the depressions in the numeral wheels of its associated set of totalizers, said means controlled by said pivoted frame actuating means, arresting means for the other of said sets of feeler levers for holding them out of engagement with the numeral wheels of its associated set of totalizers, whereby the action of said feeler members may be optionally controlled.

14. In a machine of the class described, the combination of two sets of totalizers, the numeral wheels of each set of totalizers having depressions therein, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, a set of feeler levers for engaging the depressions in the numeral wheels of one of the sets of totalizers, a set of feeler levers for engaging the depressions in the numeral wheels of the second set of totalizers, control means for each of said feeler lever sets, each of said sets of feeler levers being adapted to engage the drive wheel actuating means for controlling said drive wheel actuating means when the aforesaid feeler lever control means permit the feeler levers to engage with their respective numeral wheels.

15. In a machine of the class described, the combination of two sets of totalizers, the numeral wheels of each set of totalizers having depressions therein, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, a set of double arm pivoted feeler levers for engaging the depressions in the numeral wheels of one of the sets of totalizers, a set of triple armed bell crank feeler levers for engaging the depressions in the numeral wheels of the second set of totalizers, control means for each of said feeler lever sets, each of said sets of feeler levers being adapted to engage the drive wheel actuating means for controlling said drive wheel actuating means when the aforesaid feeler lever control means permit the feeler levers to engage with their respective numeral wheels.

16. In a machine of the class described, the combination of two sets of totalizers, the numeral wheels of each set of totalizers having depressions therein, a pivoted frame, a common set of drive wheels for actuating said sets of totalizers, said drive wheels mounted on said pivoted frame and disposed substantially intermediate the said sets of totalizers, key controlled means for actuating said drive wheels, means for actuating said pivoted frame for moving the set of drive wheels into engagement with either of the sets of totalizers, a set of feeler levers for engaging the depressions in the numeral wheels of one of the sets of totalizers, a set of levers each having a feeler member for engaging the depressions in the numeral wheels of the second set of totalizers, a control member for holding one of the sets of feeler levers in a certain ascertained position, a second control member adapted when in one position to hold the first set of feeler levers in a certain ascertained position and when in other positions adapted to hold the second set of feeler members in a certain ascertained position, each of said sets of feeler levers being adapted to engage the drive wheel actuating means for controlling said drive wheel actuating means when the aforesaid control members permit the feeler levers to engage with their respective numeral wheels.

17. In a machine of the class described, the combination of two sets of totalizers, a pivoted frame, a common set of drive wheels mounted on said pivoted frame and disposed substantially intermediate of the sets of totalizers for actuating said sets of totalizers, key controlled means for actuating said drive wheels, a printing mechanism controlled by the aforesaid actuating means and adapted to print totals from either of the sets of totalizers, means for actuating said pivoted frame to move the set of drive wheels into engagement with either of the sets of totalizers, and means to move the drive wheels out of engagement with the aforesaid key controlled actuating means, whereby the printing mechanism may be actuated without an actuation of the drive wheels.

18. In a machine of the class described, the combination of two sets of totalizers, the numeral wheels of each set of totalizers having depressions therein, a pivoted frame, a common set of drive wheels mounted on said pivoted frame and disposed intermediate of the two sets of totalizers for actuating either of said sets of totalizers, key controlled means for actuating said drive wheels, means for actuating said pivoted frame to move the set of drive wheels into engagement with either of the sets of totalizers, a set of feeler levers for engaging the depressions of the numeral wheels of one of the sets of totalizers, a second set of feeler levers for engaging the depressions of the numeral wheels of the other of said sets of totalizers, means associated with said pivoted frame for holding one of the sets of feeler levers out of engagement with the numeral wheels of one of the sets of totalizers, means for transferring the totals engaged by the feeler levers in the depressions of their associated numeral wheels to the other set of totalizers.

19. In a machine of the class described, the combination of two sets of totalizers, the numeral wheels of each set of totalizers having depressions therein, a common set of drive wheels disposed substantially intermediate the two sets of totalizers for actuating said sets of totalizers, key controlled means for actuating said drive wheels, means for moving the set of drive wheels into engagement with either of the sets of totalizers, a set of double arm pivoted feeler levers adapted to engage the depressions in the numeral wheels of one of the sets of totalizers, a set of triple armed bell crank feeler levers adapted to engage the depresisons in the numeral wheels of the second set of totalizers, control means for each of said feeler sets, each of said sets of feelers being connected to the drive wheel actuating means to control said means when the feelers are in engagement with their respective numeral wheels.

20. In a machine of the class described, the combination of two sets of totalizers, a common set of drive wheels for actuating said sets of totalizers and disposed substantially intermediate thereof, key controlled means for actuating said drive wheels, said actuating means including a set of rocker arms, the numeral wheels of each of said sets of totalizers having depressions in the periphery thereof, a set of pivoted feeler members for engaging the depressions of the numeral wheels of one of the sets of totalizers, a second set of pivoted feeler members for engaging the depressions in the numeral wheels of the other of said sets of totalizers, means to actuate the aforesaid set of rocker arms upon engagement of either set of feeler members with the depressions in its respective numeral wheels, a control member, means for locking the said first set of feeler members out of engagement with the numeral wheels upon actuation of said control member into certain ascertained positions, a second control member, said second control member adapted to lock both sets of feeler members out of engagement with the numeral wheels when moved into certain fixed position, said second control member also adapted to lock only the first said set of feeler members when in other fixed position and to lock only the said second set of feeler members when in still other fixed position.

21. In a machine of the class described, the combination of a pivoted frame, two sets of totalizers, the numeral wheels of each set of totalizers having depressions in the periphery thereof, a common set of drive wheels disposed intermediate the two sets of totalizers, means for engaging said drive wheels with either of the sets of totalizers upon a rocking of the pivoted frame, a set of rocker arms, means controlled by said rocker arms for actuating said drive wheels, a printing mechanism, said rocker arm controlled means being adapted also to control said printing mechanism, a set of pivoted double arm feeler levers for engaging the depressions in the numeral wheels of the first set of totalizers, a second set of feeler levers for engaging the depressions in the numeral wheels of the second set of totalizers, means for actuating the aforesaid rocker arms upon engagement of the said first set of feeler levers with the depressions in the numeral wheels of the first set of totalizers, means for actuating the rocker arms upon engagement of the second set of feeler levers with the depressions of the numeral wheels of the second set of totalizers, a pivoted control lever having fixed positions of rest and adapted to rock said pivoted frame, an arresting bar mounted within the pivoted frame and adapted to hold said first set of feeler levers out of engagement with the numeral wheels when the pivoted frame is in certain fixed position, a second pivoted control member having fixed positions of rest, and adapted to lock both sets of feeler levers out of engagement with the numeral wheels when moved into certain fixed position, said second control member being also adapted to lock only the said second set of feeler members when in still other fixed position.

22. In a machine of the class described, the combination of a pivoted frame, two sets of totalizers, the numeral wheels of each set of totalizers having depressions therein, a common set of drive wheels disposed intermediate the two sets of totalizers, means for engaging said drive wheels with either of the sets of totalizers upon a rocking of the pivoted frame, a set of rocker arms for actuating said drive wheels, a printing mechanism, said rocker arm controlled means adapted to also control said printing mechanism, a set of pivoted double arm feeler levers for engaging the depressions in the numeral wheels of the first set of totalizers, a second set of feeler levers for engaging the depressions in the numeral wheels of the second set of totalizers, means for actuating the aforesaid rocker arms upon engagement of the said first set of feeler levers with the depressions in the numeral wheels of the first set of totalizers, means for actuating the rocker arms upon engagement of the second set of feeler levers with the depressions of the numeral wheels of the second set of totalizers, a pivoted control lever for actuating said pivoted frame into fixed positions, means associated with said pivoted frame for holding the first set of feeler levers out of engagement with the numeral wheels of the first set of totalizers, a second control member having fixed positions of rest, means associated with the said second control member for holding both sets of feeler levers out of engagement with the depressions of the numeral wheels of both sets of totalizers when said second control member is moved into certain position, said means adapted to lock only the first set of feelers when the said control member is in other fixed position, and said means also adapted to lock said second set of feeler members when said second control member is in other fixed positions.

23. In a machine of the class described, the combination of a pivoted frame, two carrier shafts, a set of totalizers mounted on each of said shafts, a common set of drive wheels mounted on said pivoted frame and disposed intermediate the two carrier shafts for actuating said sets of totalizers, key controlled means for actuating said drive wheels, means for moving the set of drive wheels into engagement with either of the sets of totalizers, means for transferring totals from each one of the sets of totalizers to the other set, a zeroizing shaft mounted in said pivoted frame, a control member for actuating said pivoted frame, and means for actuating one of said carrier shafts upon rotation of said zeroizing shaft when the pivoted frame is in certain fixed position.

24. In a machine of the class described, the combination of a pivoted frame, two carrier shafts, a set of totalizers mounted on each of said shafts, a common set of drive wheels mounted on said pivoted frame and disposed intermediate the two carrier shafts for actuating said sets of totalizers, key controlled means for actuating said drive wheels, means for moving the set of drive wheels into engagement with either of the sets of totalizers, means for transferring totals from each one of the sets of totalizers to the other set, a zeroizing shaft mounted in said pivoted frame, a toothed sector fixed upon said zeroizing shaft, a toothed wheel fixed upon said first carrier shaft, and means for rotating said zeroizing shaft, said toothed sector being adapted to engage said toothed wheel upon rotation of said zeroizing shaft when said pivoted frame is in certain fixed position.

25. In a machine, of the class described, the combination of a pivoted frame, two carrier shafts, a set of totalizers mounted on each of said shafts, a common set of drive wheels mounted on said pivoted frame and disposed intermediate the two carrier shafts for actuating said sets of totalizers, key controlled means for actuating said drive wheels, means for moving the set of drive wheels into engagement with either of the sets of totalizers, means for transferring the totals from each one of the sets of totalizers to the other set, a control member having fixed positions of rest adapted to actuate said pivoted frame, a zeroizing shaft mounted in said pivoted frame, a toothed sector fixed upon said zeroizing shaft, means for rotating said zeroizing shaft, a toothed wheel fixed upon said first carrier shaft, said toothed wheel being adapted to be turned one revolution when engaged by said toothed sector upon a single revolution of said zeroizing shaft, and cam operated means to further actuate said carrier shaft following disengagement of said toothed sector with said toothed wheel while the zeroizing shaft completes its revolution.

26. In a machine of the class described, the combination of a pivoted frame, two carrier shafts, a set of totalizers mounted on each of said shafts, a common set of drive wheels mounted on said pivoted frame and disposed intermediate the two carrier shafts for actuating said sets of totalizers, key controlled means for actuating said drive wheels, means for moving the set of drive wheels into engagement with either of the sets of totalizers, means for transferring the totals from each one of the sets of totalizers to the other set, a control member having fixed positions of rest adapted to actuate said pivoted frame, a zeroizing shaft mounted in said pivoted frame, a toothed sector fixed upon said zeroizing shaft, means for rotating said zeroizing shaft, a toothed wheel fixed upon said first carrier shaft, said toothed wheel being adapted to be turned 360° by its engagement with said toothed sector upon a single revolution of said zeroizing shaft, cam operated means to effect a deceleration of the toothed wheel after it passes its 360° position during the latter part of the revolution of the zeroizing shaft.

27. In a machine of the class described, the combination of two sets of totalizers, a pivoted frame, a common set of drive wheels mounted on said pivoted frame for actuating said sets of totalizers and disposed substantially intermediate thereof, key controlled means for actuating said drive wheels, means for moving the set of drive wheels into engagement with either of the sets of totalizers, means for transferring totals from each one of the sets of totalizers to the other set, a main drive shaft, a control member having fixed positions of rest for actuating the aforesaid pivoted frame into a plurality of fixed positions, means to zeroize one set of totalizers upon rotation of the said main drive shaft when the pivoted frame is in certain fixed positions, the said zeroizing means being inoperable when the pivoted frame is in other fixed positions.

28. In a machine of the class described, a main drive shaft, two sets of totalizers, a pivoted frame, a common set of drive wheels for actuating said sets of totalizers, said drive wheels mounted on said pivoted frame and disposed substantially intermediate thereof, key controlled means for actuating said drive wheels, a control member having an initial position and fixed positions of rest for actuating said pivoted frame in certain fixed positions, means associated with said control member and said pivoted frame for moving the set of drive wheels into engagement with either of the sets of totalizers, means for transferring totals from each one of the sets of totalizers to the other set, a second control member having an initial position and fixed positions of rest, means to zeroize one set of totalizers upon rotation of said main drive shaft only when the said pivoted frame is in certain fixed positions of rest, cam operated restoring means to restore first said control member from a position of rest to its initial position upon a revolution of the main drive shaft, cam operated restoring means to restore said second control member from a position of rest to its initial position upon a revolution of the main shaft, both of said cam operative restoring means operative only when both of said control members are in predetermined fixed positions.

29. In a machine of the class described, a main drive shaft, two sets of totalizers, a pivoted frame, a common set of drive wheels for actuating said sets of totalizers, said drive wheels mounted on said pivoted frame and disposed substantially intermediate thereof, key controlled means for actuating said drive wheels, a control member having three positions for actuating said pivoted frame in three corresponding positions, means associated with said control member and said pivoted frame for moving the set of drive wheels into engagement with either of the sets of totalizers, means for transferring totals from each one of the sets of totalizers to the other set, a second control member having four positions, means to zeroize one set of totalizers upon rotation of said main drive shaft only when the said pivoted frame is in certain positions, means associated with said second control member for controlling the transferring of totals from one of the said sets of totalizers to the other, cam operated means for restoring the three position control member to its initial position during a single revolution of the main shaft, a cam disc with concentric grooves, means cooperating with said cam grooves for restoring the four position control member to its original position during a single revolution of the main shaft.

30. In a machine of the class described, a main drive shaft, two sets of totalizers, a pivoted frame, a common set of drive wheels for actuating said sets of totalizers, said drive wheels mounted on said pivoted frame and disposed substantially intermediate thereof, key controlled means for actuating said drive wheels, a control member having three positions for actuating said pivoted frame to certain positions, means associated with said control member and said pivoted frame for moving the set of drive wheels into engagement with either of the sets of totalizers, means for transferring totals from each one of the sets of totalizers to the other set, a second control member having four positions, means associated with said second control member for controlling the transferring of totals from one of the said sets of totalizers to the other, means for locking the three position control member against movement into one of its positions, means for locking the four position control member against movement out of its initial position.

In testimony whereof I have signed my name to this specification.

ERNST KASSNER.